United States Patent [19]

Herscovici

[11] Patent Number: 4,663,721

[45] Date of Patent: * May 5, 1987

[54] GEAR CUTTER

[75] Inventor: Saul Herscovici, Waterloo, Iowa

[73] Assignee: Power Engineering and Manufacturing, Ltd., Waterloo, Iowa

[ * ] Notice: The portion of the term of this patent subsequent to May 11, 1999 has been disclaimed.

[21] Appl. No.: 376,568

[22] Filed: May 10, 1982

Related U.S. Application Data

[63] Continuation-in-part of Ser. No. 6,226, Jan. 24, 1979, Pat. No. 4,329,096.

[51] Int. Cl.$^4$ .......................................... G06F 15/46
[52] U.S. Cl. .................................. 364/475; 364/150;
364/166; 364/167; 318/561; 318/571; 408/3;
408/11; 409/15
[58] Field of Search ............... 364/475, 474, 472, 150,
364/153, 156, 166, 167; 318/561, 571; 409/15,
153; 408/3, 10, 11, 12

[56] References Cited

U.S. PATENT DOCUMENTS

| | | | |
|---|---|---|---|
| 2,962,166 | 11/1960 | Miles et al. ............................ | 409/1 |
| 3,784,798 | 1/1974 | Beadle et al. ......................... | 364/156 |
| 3,793,575 | 2/1974 | Sieradzki et al. ..................... | 318/571 |
| 3,841,198 | 10/1974 | Cornford ............................... | 409/15 |
| 3,949,285 | 4/1976 | Rosshirt ................................ | 318/571 |
| 4,031,368 | 6/1977 | Colding et al. ....................... | 364/475 |
| 4,079,235 | 3/1978 | Froyd et al. .......................... | 364/475 |
| 4,084,083 | 4/1978 | McNally et al. ...................... | 318/525 |
| 4,178,537 | 12/1979 | Angot .................................... | 409/15 |
| 4,208,155 | 6/1980 | Sabbioni ................................ | 409/15 |
| 4,253,050 | 2/1981 | Angot .................................... | 318/561 |
| 4,267,495 | 5/1981 | Wilterdink ............................. | 318/561 |
| 4,279,013 | 7/1981 | Cameron et al. ..................... | 364/474 |
| 4,329,096 | 5/1982 | Herscovia ............................. | 318/561 |
| 4,330,832 | 5/1982 | Kohzai et al. ........................ | 364/474 |
| 4,338,556 | 7/1982 | Hetzel .................................... | 408/11 |
| 4,355,446 | 10/1982 | Shimajini et al. .................... | 408/3 |
| 4,375,670 | 3/1983 | Kralowetz ............................. | 364/474 |
| 4,408,280 | 10/1983 | Bedini et al. ......................... | 318/571 |
| 4,414,495 | 11/1983 | Sumi et al. ............................ | 318/571 |

*Primary Examiner*—Jerry Smith
*Assistant Examiner*—John R. Lastova
*Attorney, Agent, or Firm*—Breneman, Georges, Hellwege & Yee

[57] ABSTRACT

A method and control system for gear cutting machines such as hobbing equipment, shaper cutters and bevel-cutting equipment for achieving greater accuracy, productivity, and gears of increased quality while eliminating error, tedious calculations, labor and product variation is provided by employing a control system and utilizing a method of gear cutting wherein optimum cutter efficiency is maintained by electronically monitoring and controlling cutter input power, cutter shift and workpiece feed or in an alternative embodiment by varying index drive and feed drive in response to inputs measured from the cutter or cutter motor to produce gears approaching the optimum theoretical calculated configuration. The computer and control system can be readily adapted to existing gear cutting machines by utilizing an alternative embodiment of the invention which adds an encoder to the main cutter motor and replaces existing mechanical linkages for feed and index with variable speed electric motors and encoders to provide computer controlled index and feed rates that may be varied substantially instantaneously with the cutting of each gear tooth to maintain a predetermined cutter program. The method of cutting gears and the control system provides for the production of more accurate gears by eliminating the use of cams in shaper cutters and the use of change gears in hobbing machines and by properly controlling hob shift to result in an increased hob cutter lift and provide higher production of optimally designed gears.

21 Claims, 30 Drawing Figures

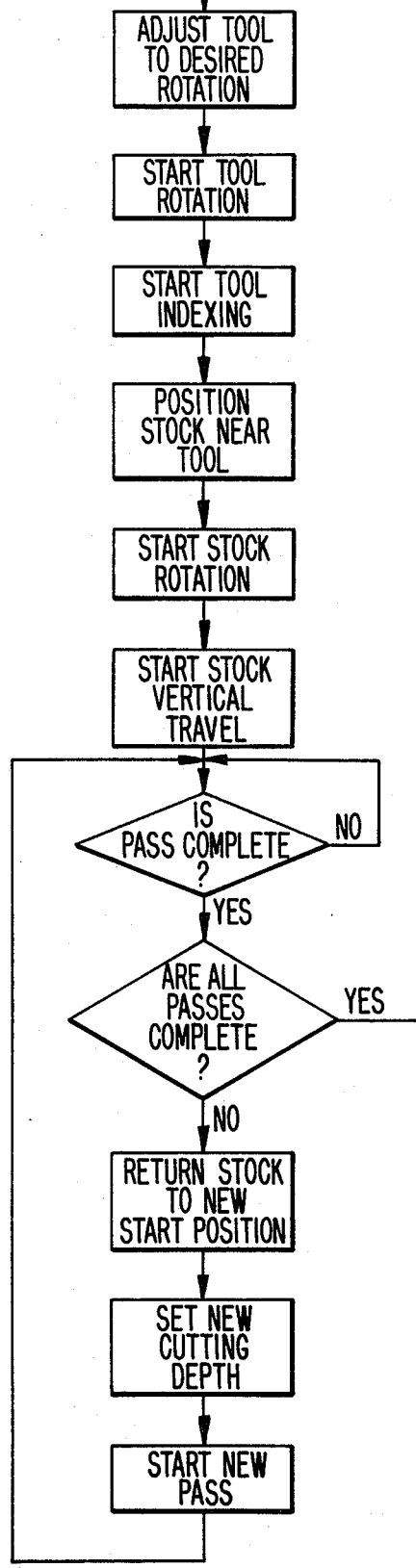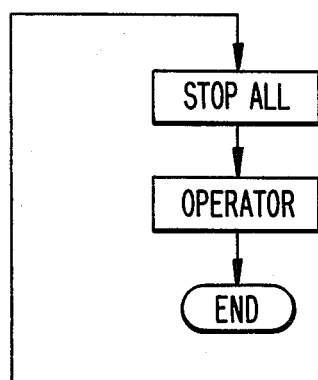
FIG. 8A.
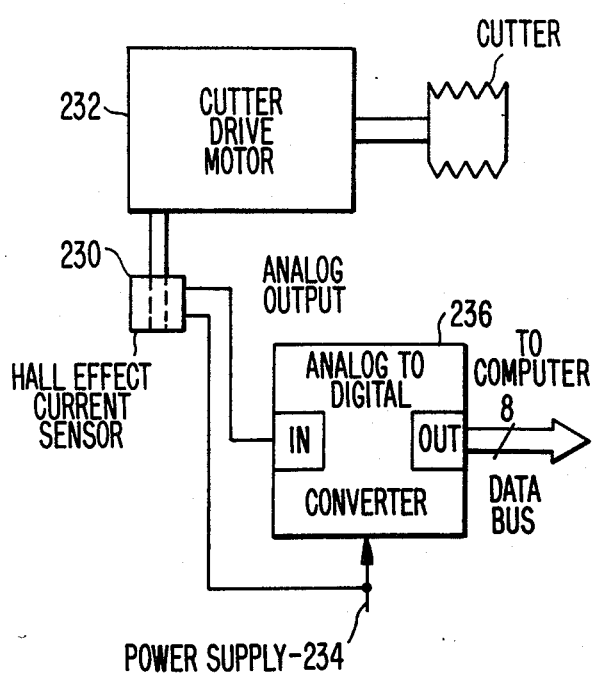
FIG. 11.

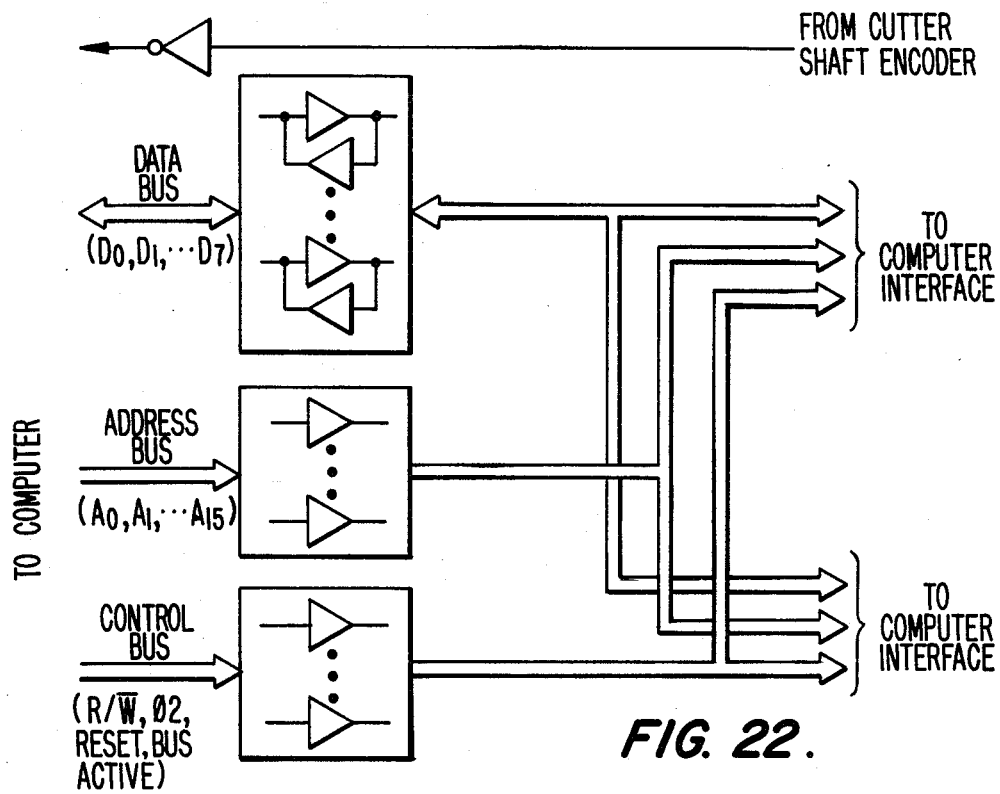
FIG. 22.
FIG. 23.
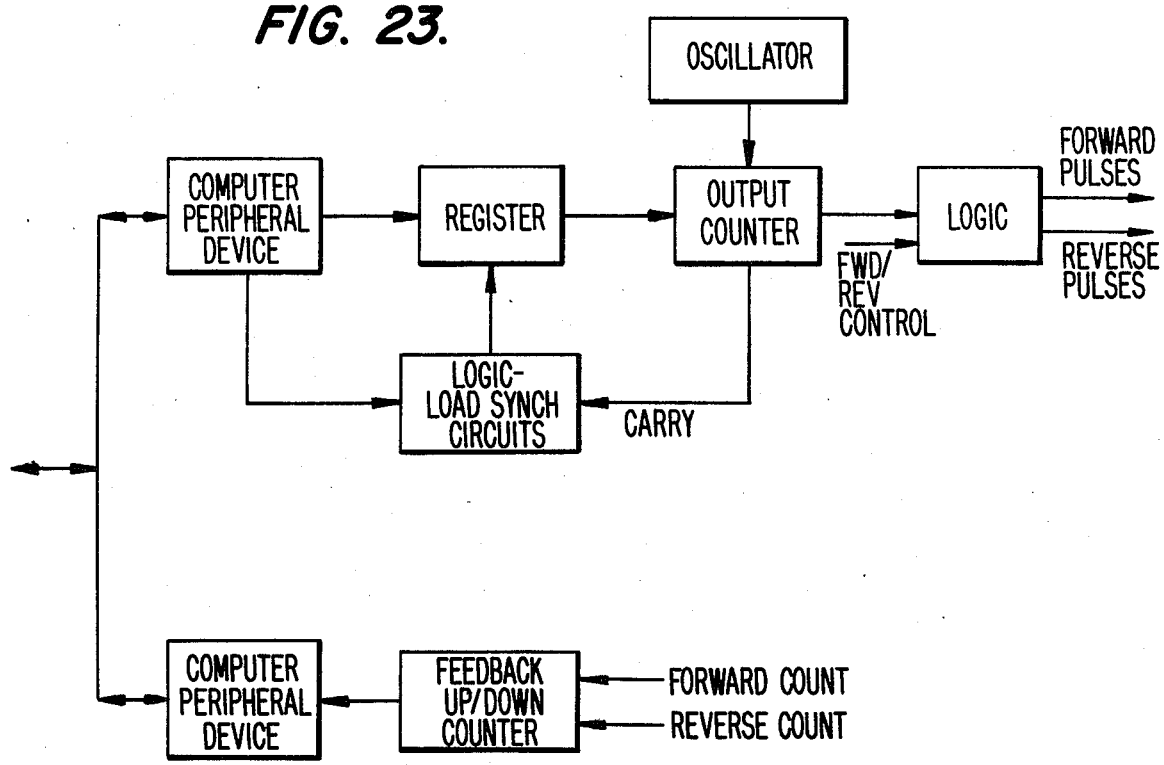

GEAR CUTTER

BACKGROUND OF THE INVENTION

1. Cross Reference to Related Applications

This invention pertains to new and useful improvements in gear cutting machines and constitutes a continuation-in-part application of application Ser. No. 6,226 filed Jan. 24, 1979, now U.S. Pat. No. 4,329,096 issued May 11, 1982 which disclosure is incorporated by reference.

2. Field of the Invention

The invention relates to improved gear cutting machines and the modification of existing gear cutting machinery having optimum characteristics of tooth angle, face, proper top and bottom lands and spacing to yield gears of optimal efficiency, increased strength and having reduced operational noise levels for the particular application and material from which the gear is constructed. More particularly, the invention pertains to the modification of existing hobs and shaper cutters by the replacement of change gears and cams with a combination of electronic variable speed motors and an electronic control system for controlling the cutter to obtain and maintain the proper index, helical angle and the number of cutter starts by monitoring and controlling the cutter to efficiently cut a variety of gears for various applications utilizing a variety of metals from which gears may be constructed.

3. Description of the Prior Art

The prior art of cutting gears utilizing shaper cutters and hobbing machines includes a variety of apparatus and methods designed to improve gear cutting in the production of gears. One method for increasing the accuracy of hobbing machines has been to increase the size of the machine bed, the rotary machine table and the hob cutter to increase the gear tolerances attainable in the hobbing operation. It is well known in the gear cutting art that close tolerances including proper tooth size, diametral pitch, clearance, depth and backlash must all be controlled to not only assure proper meshing of gears but also to assure prolonged service life. These problems are further compounded in the cutting of helical and spur gears and the production of worm gears in which a change gear has heretofore been employed in the prior art to approach the proper helix angle. In these applications, and in other applications, gears are sometimes cut in at least two operations so that after the production of a rough gear, the gear is then further machined in a second machine for cutting at closer tolerances to provide the proper pitch lead and tooth profile. Under these procedures, it is possible to cut too small a gear or not cut enough material away from the gear blank thereby resulting in excessive wear of components in the second closer tolerance machine resulting in a waste of time, labor and materials.

It is understood by those skilled in the art that the operational reliability, service life and efficiency of equipment utilizing gears depends greatly upon the precision and the quality of workmanship expended in the production of gears. In addition, it is known that service life, operational efficiency and the noise level and environmental considerations in work places utilizing machines with transmissions and gears depends upon quality, precision, and tolerances of the gears produced. Consequently, the production of gears having tolerances approaching the calculated theoretical values provides a means for the reduction of noise levels from the machinery and for stronger and more durable equipment.

As recognized by those skilled in the art, gear cutting is a discontinuous process that subjects cutting machines to shock resulting in vibrations and a non-uniform tool wear that has been accommodated in some of the prior art hobbing machines by providing a fixed amount of hob shift that was dependent on the number of revolutions of the cutter or in some machinery by not providing cutter shift. In either case the uniform wear of the hob depended on the intuitive knowledge of the workman as to the amount of the hob travel or in setting up the machine as to the condition of the hob in relation to the material of the gear blank, size and the type of gear being cut. The intermittent machining process encountered in hobbing operations in addition to problems resulting from backlash and shock loads and machine vibrations result in increased random tool wear further resulting in the production of gears that do not provide the degree of tolerance necessary to optimize life and machine efficiency. As a result, imperfect gears operate by generating more noise and are subject to fatigue, cracking and breaking.

The prior art has recognized the problems of accuracy in cutting gears and has attempted to solve these problems by utilizing larger machines having components of closer tolerances so that the travel, speed and friction imposed on the various components are more perfectly controlled to result in the production of more perfect gears. In U.S. Pat. No. 2,962,166, a gear sorting device is disclosed for the production of gears. In U.S. Pat. No. 2,962,166, the automatic gaging and sorting of the output of the machine tool is provided to alleviate a combination of defects such as errors in the axial separation of the hob and gear blank, worn hob, hob shift or other such type of adjustments. Further, it is pointed out that random variations may indicate a hobbing adjustment even though the hob is sharp and the axial separations are substantially correct. As a result, in U.S. Pat. No. 2,962,166, the adjustments to the hobbing machine are made only after a number of gears have exhibited the same defect or defects. It is, of course, fundamental that making changes in the hobbing machine after the production of more than one gear may as a result of trial and error result in future gears having greater tolerances and preferred configurations. It is, however, further apparent that gears already produced may either be wasted or require further operations to put them into a usable condition.

In U.S. Pat. No. 3,254,566, an electronically controlled fluid motor powered machine is disclosed wherein an electronic computer means responsive to the rotation of the hob or cutter provides selective control by which preselected values may be correlated electronically and transmitted to actuate a lead screw and work spindle in response. However, in U.S. Pat. No. 3,254,566, the calculations and functions of the machine provide computer calculations for the speeds and relationships of the various axes involved and thereafter presume hob rotation and efficiency with respect thereto. Furthermore, hob shift and hob cutter control, which is one of the most important aspects in the production of high quality gears, are not suitably controlled. Moreover, U.S. Pat. No. 3,254,566, employs a hydraulic motor to provide a variable speed to thereby eliminate the traditional change gears. As will be recognized by those having knowledge of hydraulic systems, time lags of a few seconds are inherent in the use of fluid activated and controlled systems. As a result, the response time of such systems are measured in seconds, with the fluid system searching to catch up with the computerized system. As a consequence the method of hobbing provided in U.S. Pat. No. 3,254,566 does not contemplate the relatively instantaneous positive correction of errors contemplated by the present invention or the modification of existing machinery by adding electronically controlled and activated variable speed motors slaved to the main electrical cutter drive motor.

In the present invention, the computer correlates and improves upon the efficiency of the gear cutting machine components such as base, bearings, feed components and rotational components to improve the quality of produced gears. However, improper machine set-up, operation and wear of the cutter and gear cutting machine results in the production of imperfect gears notwithstanding the theoretical calculations. Many of these imperfections can be attributed to the change gears and cams employed in prior art gear cutters that were necessary to coordinate index and feed with the main cutter drive through cams and change gears which contributed to backlash and the inaccuracies implicit in the machine. As a result, the production of quality gears in the prior art has relied primarily upon the intuition of the workman cutting the gear to produce a more uniform and optimized gear by taking into account cutter efficiency, hob shift, rotational speed and the metallurgical composition of the gear blank. As a result, many prior art gear cutting machines were set up to cut only one gear for prolonged periods resulting in the purchase of many machines, each set up for a particular gear because of the problems involved in setting up and controlling gear cutting machinery to obtain reproducible results and closer tolerances.

SUMMARY OF THE INVENTION

The disadvantages and limitations of the prior art methods and procedures, including much of the work and calculation required for determining the optimum conditions for a gear and the labor required in setting up, monitoring and attempting to ascertain whether a given set of calculations are being translated into a gear of optimal characteristics are dispensed with by the present invention.

The present system for the modification of existing machinery for cutting gears and control system for providing gears of preferred characteristics are provided for by eliminating the cams and change gears from gear cutting machinery and instead attaching electronically driven and controlled variable speed electric motors to the index and feed drives and slaving these motors to the main cutter motor. The gear cutting operation can then be advantageously controlled by using the computer to initially calculate the optimal conditions for a given type of gear and then positively controlling the cutting of gear by providing a constant monitoring and optimizing of the progress of the cutter by modifying such parameters as index drive and feed drive in the actual cutting of the gear from the gear blank. The variable electronic drives ahd controlled gear cutting machines of the invention are capable of detecting and positively correcting gear cutting imperfections within millionths of a second by varying the variable feed and/or index power drives to produce gears having tolerances approaching the calculated theoretical.

The method and control system of the present invention is the product of extensive research investigations into the control, operation and techniques for optimizing the parameters necessary to increase productivity and quality of gears. The method and control system of the present invention monitors the efficiency of the cutter in relation to the gear being cut and reduces set-up time and error by assuring the feed and index drives are positively and properly coordinated with the main drive motor which drives the cutter to produce the calculated optimized gear. The result of the constant monitoring provides higher quality gears since the present control system is designed to monitor and make changes if necessary in the index and feed drive rates during each rotation of the cutter.

The present invention is not only applicable to existing hobbing machines but also to shaper cutters and other existing gear cutting machines to provide a higher productivity and accuracy of gears cut in accordance with the invention. More particularly the advantages of the invention results from the utilization of a computer to reduce set-up time and to eliminate time consuming calculations and allow the utilization of variable speed electric motors for feed and index drives that are controlled by the computer in relation to pulses received from the main motor driving the cutter which eliminates the search for proper change gears in both hobbing machines and shaper cutters and also eliminates the cams in the shaper cutter. The present method and system of modifying existing gear cutter equipment improves the quality of the gears produced, increases the life of the cutter and maintains better quality control of gears produced, by eliminating human error and optimizing and providing the conditions required for the production of optimal gears.

Gear cutting equipment such as hobbing machines, shaper cutters and other such gear cutting equipment having a main motor for operating a cutter and associated change gears or cams for actuating feed and index drives can be modified in accordance with the present invention by attaching variable speed electric motors directly to the feed and index drive shafts to eliminate the change gears and cams thereby eliminating backlash and the inaccuracies and limitations in the machine to provide a positive system of controlling the progress of the cutting of the gear. A shaft encoder is attached to the main cutter motor and cutter pulses are counted and fed into the computer which responds to these pulses by controlling the variable speed electric motors to control feed and index drive. The computer system in response to readings from the main cutter motor operates as an electronic gearbox to provide a virtually unlimited selection of index and feed rates in response to the operation of the cutter to insure the production of gears that approach the theoretical configuration previously calculated by the computer.

In modifying existing gear cutting equipment in accordance with the invention belt drives and pulleys along with any hydraulic drives are preferably replaced with a more positive drive system using gears or worm gears to eliminate errors resulting from belt slippage around the pulley or potential problems of lag in hydraulic systems. For example, in the standard Model 140 hobbing machine manufactured by The Cleveland Hobbing Machine Company and the Barber Coleman Model No. 6 Shaper Cutter the main drive motor provides drive for the cutter by employing a pulley belt combination which is thereafter geared to the feed, index and other optional drives. Such pulley driven machines are preferably modified by first replacing the pulley drive with gears and then eliminating the geared feed, index and other optional drives that were attached to the main motor.

The modification of existing gear cutting machinery such as hobbing machines and shaper cutters including the addition of encoders and variable speed electric motors and their control by the computer is in many respects similar. Shaper cutters and hobbing machines modified in accordance with the invention utilize the main drive motor for driving the cutter and utilize an encoder disposed preferably on the main motor shaft to provide information to the computer as to the progress of the cutter. The main motor in the hobbing machine is responsible for the rotation of the hob and in shaper cutters the main motor is responsible for the reciprocal motion of the cutter.

The feed and index drives of shaper cutters and hobbing machines that were connected to the main motor through cams and/or change gears are modified in accordance with the present invention by attaching variable speed electric motors to the index and feed drive shafts along with shaft encoders which are controlled by the computer in response to impulses received and compared from the encoder associated with the cutter. The separate variable speed electric motors can then be positively controlled by the computer as gear cutting progresses.

Other drives may similarly be positively controlled by the computer on existing machines. The center distance control for hobbing machines and shaper cutters may be similarly controlled by disconnecting any existing drives from the main motor and replacing them with variable speed electric motors and position sensors to provide information with which the computer can independently control center distance in the cutting of the gear. In a preferred embodiment of the invention a rapid travel motor is also added to existing gear cutter machinery to assist in the positioning of the gear blank and cutter. The rapid travel motor is similarly controlled by the computer and is combined with position sensors or alternatively an encoder to provide information to the computer as to the position of the cutter and gear blank before the engagement of the variable speed electric motors responsible for gear blank feed and index drives.

Some existing gear cutting machines have a control for hob shift during the cutting of the gear. Such existing machines may be further modified to provide additional advantages by changing the operator controlled cutter shift or the prior art forms of automatic cutter shift that has heretofore shifted the cutter after a predetermined number of gears have been cut or a continuouse cutter shift to a cutter shift positively controlled by computer. In existing machines having cutter shift capabilities the cutter shift drive is directly geared to a variable speed electric motor having a position sensor to provide information to the computer from which the sharpness or cutting efficiency of the cutter can be calculated.

The modification of prior art gear cutting machines having cutter shift controls further increases the accuracy of gears cut and increases cutter life by providing cutter shift based upon the condition of the cutter rather than an automatic shift or one based upon the intuition of the workman. The computer controlled variable speed cutter shift provides uniformity along the cutting surface of the cutter and allows the entire cutting area of the cutter to be utilized to provide maximum cutter life. In addition, proper cutter shift not only fosters proper tooth profile but also assures maximum cutter life.

The proper cutter shift varies with not only the size of the cut but also the composition of the gear blank and the rate of feed. The method of the present invention includes not only the predetermination of the permissible amount of cutter shift to assure proper gear profile but also the monitoring and controlling of the cutter shift, rate of feed and in one embodiment the amount of power utilized by the cutter in conjunction with the size of the cut and composition of the gear blank. These inputs in utilizing the method and control system of the present invention allow adjustment of the cutter speed and feed rates in conjunction with cutter shift to produce the necessary chip removal to provide gears having optimized characteristics approaching the calculated theoretical.

In existing gear cutting machines where cutter shift is provided the present invention can utilize the computer to determine and record the last position of the cutter to provide a more uniform use of the cutter surface. The proper control of cutter shift allows the change in the direction of cutter during operation to complete the cutting and start a second complete cutter shift in a direction opposite the first travel to provide more uniform wear of the cutter and a commensurate uniformity of the gears cut. In this manner, cutter shift can be continously reversed until the cutter requires resharpening.

The present method and control system of the invention transforms existing mechanical gear cutting machines into a computerized system in which the computer is employed to calculate an optimal gear profile and then cut the gear by receiving signals from electronic readout and measuring devices to control and instruct variable speed electrical motors. The state of the art system of manually measuring the workpiece and manually changing the components of the machine to achieve the desired effect during gear cutting operations is replaced by the computer in combination with electronic readout and measuring devices and electrically driven variable speed motors which perform the manual operations not only more rapidly but also with greater precision. The components utilized in the present invention include a computer for feeding information into a computer interface for monitoring and controlling measuring devices and indexing mechanisms for the control of the variable speed electric motors necessary to translate the calculated optimized gear features into gears that can be produced by existing gear cutting machines utilizing the method and control system of the invention.

The invention allows set up time to be reduced to about 10 minutes. As a result, the utilization of the computer and computer controlled variable speed electric motors and sensors combined with existing equipment allows one machine to be quickly changed to cut different types of gears without going through the calculations and timely machine set up that has heretofore been required. The invention however provides numerous advantages in the cutting of the gears since backlash is eliminated and the cutting process is positively controlled by the computer to assure that necessary changes are made as the gear is being cut to conform the gear to the calculated values.

Initially, pertinent data such as the number of teeth, diametral pitch, pressure angle, helical angle, amount of feed, number of passes, machine constant, hob constant, etc., are fed into a computer which in turn performs calculations to arrive at information to be transferred to the computer interface which are optimally connected to allow the computer interface to feed information back to the computer. The computer may optimally include a printout providing an inspection list of items to be checked before commencing the actual cutting of the gear. Once the gear cutting begins, the actual progress of each of the components necessary for the production of a gear of high efficiency is constantly rechecked by the computer and necessary changes in speeds of the feed and index drives are made to provide an optimazation of the cutting of the gear.

In those machines having cutter shift designed in accordance with the invention a further variable speed electric motor having a power monitor may be geared into the hob shift control to provide variable cutter shift when a predetermined measurement of power impulses on the main drive motor is achieved to indicate a dulling of the cutter. In such machines the control system of the present invention is designed to take into account the condition of the cutter and provide instructions for resharpening the cutter at a predetermined cutter dullness by monitoring the amount of power required to cut the gear in correlation to the other variable parameters. The computer may also include inputs for changes in pitch diameter resulting from the resharpening of the cutter. With this information in conjunction with the center distance between the cutter and gear blank, the computer can instruct the computer interface as to how far to feed the cutter to obtain the desired gear tooth thickness. The control system of the invention can also determine how many passes to make and how much metal to remove on each pass while determining the particular cutter action required to effectuate the desired metal removal.

A vertical readout system can be provided to provide information to the computer as to the location of the top and bottom surfaces of the gear blank. From this information, the computer can compute the area of space required to cut an optimized gear. In conjunction with this information, the computer, can calculate the place to start the initial cut on the gear blank because the additional space for the radius of the cutter has already been taken into account. After the first pass, the cutter is instructed to retract rapid travel to the beginning of the blank for a second pass. The second pass does not have to start as far up as the first pass since the requirement for the allowance of the radius of the cutter is smaller. These passes are repeated until the computer detects that the gear produced meets the theoretical calculated conditions for the optimal gear. At this point, the cutter retracts to the unload position and the process begins over again until all the gears desired have been produced. Alternatively after the first pass an increased productivity may be attained by eliminating the use of rapid travel and instructing the computer to switch from climb cutting to conventional cutting and/or vice-versa at the end of each pass to eliminate the loss of production time when using rapid travel in conjunction with conventional cut only or climb cut only.

A memory storing device may also be provided so that once a gear has been cut the necessary data may be stored in the computer according to the part number. When a previously cut gear is required to be cut again, the part number can be punched in and the computer can be programmed to instruct the operator which fixture and cutter are to be used and also print out an inspection list.

The present control system and method may be optimally adapted for the mounting of two cutters to the hob head for cutting one or more sets of teeth on the gear without changing machines. This operation may be utilized, for instance, in cases where there is a need to cut more than one set of teeth on the same blank with each set of teeth having a different configuration. This may be conveniently accomplished in a modification to be discussed hereinafter in greater detail to provide a multiple set of teeth on a gear blank without having to load the blank twice or to recalculate the indexing between the two sets of gear teeth. This is particularly advantageous in situations where each of the sets of teeth on the gear blank requires a different cutter. The method of cutting gears and control system of the hobbing machine may be modified so that the second cutter may be placed in the cutting position and the second set of teeth cut on the blank automatically.

The cutter may be mounted on a motor driven ring to allow the cutter to be changed automatically to the proper angular position. A magnetic readout or measuring device may also be attached to relay information to the microprocessor for monitoring and further controlling the cutting operation of the hob. Preferably, two other magnetic readouts, one to measure the center distance between the center of the gear and the center of the cutter are utilized along with a measurement of the vertical position of the gear blank to feed information into the microprocessor to make necessary calculations during cutting operations. Another method of using two or more cutters of different tooth configuration is to mount both of the cutters on the same shaft but provide a sufficiently large amount of hob shift travel to enable positioning of the desired cutter in the proper axial cutting location.

The present invention transforms existing gear cutting machines into precision gear cutters which positively control the gear cutting operation by electronically varying feed and index drives in relation to the operation of the cutter. In accordance with the invention the main motor drives the cutter while the index, feed and the other drives are independently controlled by the computer to allow the computer to modify these variable drives to achieve a predetermined program for cutting gears. The precise number of drives that are coordinated and modified by the computer depends on the prior art gear cutting machine. Generally all such prior art machines modified in accordance with the present invention have a main cutter drive with feed and index controlled by the computer with additional drives being optional and dependent on the particular prior art machine being modified.

The computer in monitoring the cutting of the gear and changing parameters assures the calculated equation representing the most efficient gear possible is provided during cutting operations. Furthermore, by monitoring and adjusting feed and index drives the method and control system of the present invention assures that subsequently produced gears conform with previous gears so that a high degree of uniformity and reproducibility is provided utilizing existing gear cutting machinery. The method of the present invention further contemplates utilizing each of the drives of prior art gear cutting machines and independently controlling and varying these drives in relation to a predetermined program for producing gears of an optimal configuration. In machines having cutter shift capabilities the invention contemplates the cataloging of the cutter and cutter position with respect to the last gear cut so that the cutter when placed in the gear cutting machine can be placed in an exact axial position with respect to the last gear produced to provide a uniform wear on the cutter and assist in the production of gears that have uniformly been cut utilizing a more uniform cutting element.

Other advantages of the invention will become apparent to those skilled in the art from the specification in conjunction with the appended drawings which illustrate further aspects of the novel method of hobbing and control system of the invention.

DESCRIPTION OF THE DRAWINGS

The invention will be further described in the following detailed description of the invention in conjunction with the accompanying drawings in which:

FIGS. 8 & 8A represent a flow chart of one form of a logic system for hobbing in accordance with the invention;

FIG. 11 is a diagrammatic illustration of one form of a cutter power sensor circuit for monitoring and controlling cutter power in accordance with the invention;

FIG. 22 is a flow chart of the buffer electronics of FIG. 20.

FIG. 23 is a flow chart illustrating the computer interface electronics of FIG. 20;

DETAILED DESCRIPTION OF THE INVENTION

Figure 1:
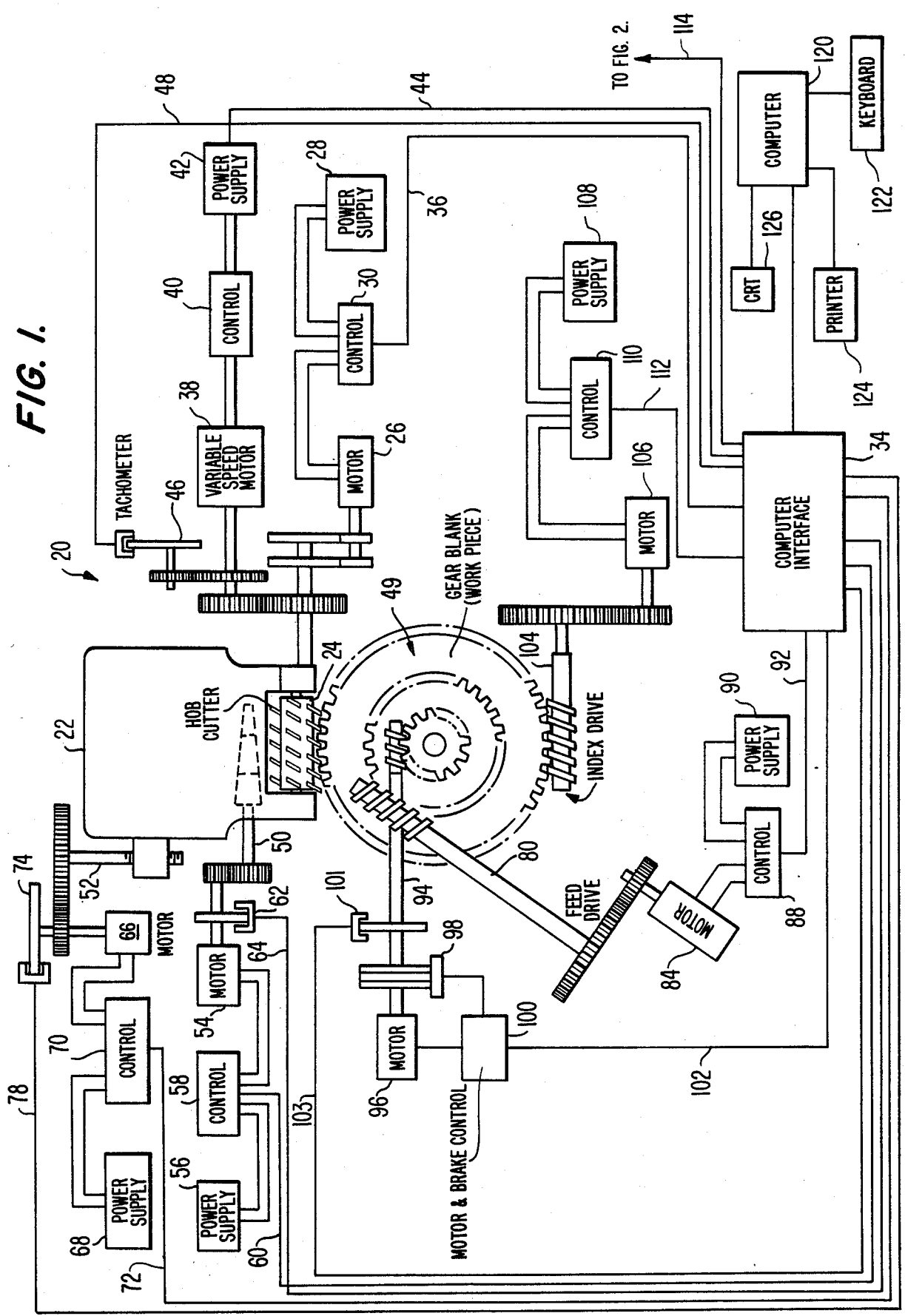
FIG. 1 is a diagrammatic illustration of a hobbing machine or the like depicting the application of a computer and control system to the machine in accordance with the invention.

The present invention provides for the automation of gear cutting machines including the modification of existing gear cutting machines by employing a computer and computer control of the gear cutting operation. The computer is utilized to calculate the configuration of the gear and then employed to insure that the proper feed, index and cutter combination is employed in the gear cutting operation. The computer may also be employed to store information as to gears previously cut and monitor the condition of the cutting element.

The invention in its broadest aspects pertains to the computer control of the gear cutting operation by electronically varying feed and index rates in relation to constant cutting element drive or the variation of cutter power where feed and index drives are maintained relatively constant. In other embodiments of the invention additional drives such as cutter shift and center distance may be similarly controlled by the computer during gear cutting operation. The manner of controlling the various drives with a computer depends on the drives built into the machine and whether a new or existing gear cutting machine is modified in accordance with the invention.

Existing gear cutters modified in accordance with the invention or gear cutters designed utilizing the principles of the invention eliminate the change gears, cams and other elements that connect the main cutter to the various drives in a mechanical timed relationship. The invention allows the main motor to drive the cutter while independent variable speed electric motors control the individual drives of feed and index. The independent control of each of these drives by the computer allows them to be varied by the computer as necessary as each tooth of the gear is in the process of being cut.

It will be recognized that gear cutters constructed in accordance with the invention may be controlled by controlling the feed and index drives in relation to pulses received by the computer from the main motor or by providing a variable speed electric motor to drive the cutter while measuring and varying the power necessary to drive the main motor as described in my parent application Ser. No. 6,226 which will issue as U.S. Pat. No. 4,329,096 on May 11, 1982.

Gear cutting machinery can be modified in accordance with U.S. Pat. No. 4,329,096 but it has been discovered that modification of existing gear cutter machinery may be more readily and inexpensively accomplished by utilizing the original gear cutter motor to drive the cutter and removing the mechanically entrained drives and replacing them with variable speed electric motors that are controlled in response to pulses received by the computer from a shaft encoder attached to the main cutter motor. As will be appreciated hereinafter the present invention allows the modification of various types of gear cutters including hobbing machines, shaper cutters and other types of gear cutting machines that can take advantage of all the features present in the existing gear cutting machine.

The method and control system for cutting gears of the present invention in its broadest aspects eliminates the time consuming process of tedious calculation and machine set up time necessary for determining angles, dimensions and the required number of teeth on the gears and the traditional cams and change gears in shaper cutters and the change gears for hob speed, hob feed, hob shift and workpiece feed and index in hobbing machines. The traditional change gears are replaced by variable speed electric motors and an electric motor control system in conjunction with a rotating axis control for monitoring the cutting action of the cutter. The method and control system in hobbing machines provides a particularly useful system for the production of helical gears which are generally more time consuming to calculate and cut which in the prior art, at best, have generally only approximated the dimensions of the machine gear since the helical angle obtained on gear cutting machines which heretofore employed change gears are generally slightly different than the desired theoretical helical angle. This result is inherent in the change gears which have an integral number of teeth, that is when 48.53 teeth are required to produce an exact helical angle a change gear utilizing 48 or 49 teeth must be employed to approach the theoretical desired gear configuration.

Furthermore, the physical limitations imposed by the size of the gears or the size of space available to mount the gears in a machine often make it necessary to recalculate the required number of teeth to use smaller gears. The cutting of smaller gears increases setup time and may decrease the accuracy of the helical angle thereby resulting in gears susceptible to breakage, increased wear and noise that may be obviated by the utilization of the method and control system of the invention for controlling the gear cutter and means for monitoring the effectiveness and efficiency of the cutter during its operation.

Existing hobbing machines of a variety of configurations may be modified by utilizing the main cutter motor to drive the cutter and replacing the mechanical linkages for feed and index with variable speed electric motors that are controlled by a computer in response to pulses received from a cutter shaft encoder which is attached to the main cutter motor for purpose of convenience.

In this embodiment of the invention the computer monitors the velocity of the cutter motor and calculates the numeric quantities necessary for controlling the variable speed index and feed motor velocities. When the cutter drive motor uses a larger amount of current as detected preferably by a hall effect sensor which indicates to the computer the cutter requires sharpening and from which information the computer can issue instructions to sharpen the hob or where the machine includes hob shift an additional drive may be provided so that a further variable speed electric motor is activated to provide hob shift. In the preferred embodiment of the invention a center distance control drive is provided having a variable speed electric motor that can be controlled by the computer along with feed and index to assist in the efficiency of the cutting operation of the cutter.

In existing hobbing machines, the advantages of the invention are in part a function of the variable speed control of the index and workpiece feeds in combination with a shaft encoder for providing information to the computer to positively control the feed and index rates in relation to the cutter efficiency. In an alternative embodiment of the invention a variable speed main motor and power measuring device may be employed to vary cutter power and/or provide hob shift to move the cutter axially several millionths of an inch per revolution so that as the cutter becomes dull a sharp position of the cutter is brought into cutting position. The amount of the hob cutter in contact with the gear blank and resulting hob shift varies with the circumference (O.D.) of the gear blank, the number of cutter starts and the helical angle of the blank. In the preferred embodiment the helical angle is calculated with other parameters since the smallest cutter length in contact with the workpiece takes place on the gear blanks that have the smallest outside diameter, a zero helical angle and also the fewest number of starts on the hob.

In the prior art, the hob shift overtravel tripper block must be set manually in relation to the length of each cutter length. The setting of the hob shift travel limit in the prior art has been based upon the intuitive knowledge of the machine operator or in many cases not set up at all so that the center portion of the cutter is generally preferentially used for the cutting of gear blanks. This results in a non-uniform hob wear and the production of gears that become of a successively poorer quality over the life of the hob cutter.

A significant improvement in the quality of the gear and more particularly the gear tooth profile, as well as in cutter life, is obtained by utilizing the method of the present invention wherein the maximum permissible amount of hob shift travel necessary to generate the proper gear tooth profile is provided in setting up the hob cutter in relation to the gear blank. In utilizing a computer in controlling the amount of hob shift, hob shift can be calculated and thereafter automatically varied in magnitude as required by the material hardness of the gear blank and the size of the teeth to be cut. In general, it is desirable to increase the amount of the hob shift as the size of the gear tooth increases and as the material machinability decreases. The monitoring of the efficiency of the hob cutter in relation to the gear tooth size and material machinability assures that the calculated, theoretical best angles and operation of the hob cutter and gear blank feed are provided during the cutting of the gear.

The method of the present invention in maintaining the proper amount of hob shift in relation to the gear tooth size and machinability of the gear blanks avoids excessive wear of the hob and assures that gears produced have tolerances approaching the theoretically calculated values. Optionally, an automatic control over the hob shift may be provided to change the direction of the hob shift during the operation. In this manner, once hob shift has shifted completely in one direction, the hob can be reversed to provide a second complete cutter shift travel in the direction opposite the first travel. The direction of hob shift can furthermore be continuously reversed until the cutter needs resharpening thereby increasing the cutter life and assuring a more uniform hob cutter wear by utilizing substantially the entire length of the cutter. It will, of course, be recognized that hob uniformity results in gears of greater uniformity when gear blank feed, cutter angle, speed and power are monitored and controlled.

One embodiment of the process of the present invention further includes the monitoring and recording of the power utilized in the operation of the gear cutter in conjunction with the gear blank material and the size and number of the gear teeth cut on the gear blank. It will be recognized that as the cutter becomes dull, it takes more power to operate the cutter during gear cutting operations. The life of the cutter may be increased and major cutter destruction eliminated by the monitoring and recording the power used to cut when the cutter is in a new or optimal cutting condition. When the cutter becomes too dull as determined by power input, the gear cutting machine can be automatically stopped at the end of a cutting pass, and resharpening instructions relayed to the operator. Cutter power requirements may be determined by running a sample gear with a sharp tool. This data may then be stored in the computer for comparison with future gears to be cut. In this manner, tolerances can be incorporated in the computer based system. In application of the present invention to shaper cutters the power required to operate the variable speed electric motor for providing reciprocal motion to the shaper cutter is measured and correlated in conjunction with the other parameters of gear blank feed, size of teeth, helical angle and machinability of the gear blank. Similarly, in the case of the hobbing machine the power required to rotate the hob cutter is measured and correlated with the aforementioned parameters including hob shift.

The monitoring and recording of the amount of cutting power utilized for the gear blank material in conjunction with the size of the teeth being cut along with the monitoring of the cutter rotational angular position is controlled within millionths of a second assure the most efficient cutting operation of the gear cutter is utilized during the gear cutting operation.

In the same manner the control of the hobbing machine may be achieved in the alternative embodiment of the invention by varying the variable speed, feed and index drives in response to measurements of the cutter speed velocity inputs received from an encoder mounted to the cutter. In most existing hobbing machines a variable speed electric motor may be attached to provide a computer activated center distance control in conjunction with the variable speed, index and feed drives. At such time as the rates of feed, index and center distance control provide an unacceptable rate of gear cutting the computer can provide instructions for sharpening the hob or provide hob shift if the existing machine utilizes this feature.

Those prior art machines that have hob shift capabilities can be modified in accordance with the invention by adding a variable speed electric motor to the hob shift device and a position sensor. Hob shift can be controlled by the computer in relationship to the parameters of feed and index in relation to the impulses received from the main cutter motor to assist in the production of more uniform gears as heretofore described and to extend hob cutter life.

The information as to the dimensions of the cutter particularly in the case of the hobbing machine insures that the final center distance between the gear and cutter is properly calculated and maintained during gear cutting operations. In making short runs, hob cutters are generally of different diameter, different length, different tooth size, different lead angles so that in cutting gear blanks, one or more thread starts may be employed on the hob cutter. Likewise, the gear blank metal or consistency of the material can also vary. With these parameters taken into account, the cutter life and efficiency of the cutter may be materially increased while, at the same time, the quality of gears is significantly increased by the hobbing machine. This results in not only the production of more efficient gears but also increased productivity and reduced labor in setting up the machine and making the necessary calculations and adjustments during the operation of the gear cutting machine.

In a further optional feature of hobbing machines constructed in accordance with the invention, the hob cutter life may be further improved by recording in the computer memory the axial position of the cutter as determined by the hob shift at the end of each gear cutting in machines having hob shift capability. The recording in the memory of the last cutting position of the cutter makes it possible to reposition the hob cutter in the same position several days or weeks later to utilize the last cutting position of the particular hob cutter. In this way, a more efficient gear is produced since the wear on the cutter is more uniform which as a result of the uniform wear allows the other control parameters such as variable hob speed and variable feed drive to more accurately cut gears and more readily compensate for reduced cutter efficiency. However, as heretofore described, the hob cutter has a threshold at which the hob cutter must again be resharpened or replaced at which point the computer may be programmed to stop the cutting action of the hob and issues instructions to the operator to replace or resharpen the hob cutter. When the hob cutter is either resharpened or replaced, the computer calculates the center distance between the gear blank or workpiece and the cutter and directs the cutter or workpiece positioning device to move toward that center distance in one or more steps. In this manner, the method of the present invention may utilize one or more passes in cutting gears to provide gears of varying quality. Optionally, the method of the present invention may be utilized to calculate the optimum gear angles and parameters required to cut a gear in one cutting operation.

It will be recognized by those skilled in the art that good surface finishes of high precision in quality gears are generally obtained by a shaving operation. The present invention dispenses with the need of the shaving operation while maintaining the precision and quality of the gear in that the machine may be programmed to make a final cut of a total depth of several thousandths of an inch to provide a gear with a good surface finish. The final cut which provides a gear with a high quality surface finish can be achieved by directing the computer to position the cutter in a stepped motion toward the calculated center distance between the cutter and the workpiece. Several cutting passes, as well as the final size, may be attained without stopping the machine as the computer can be programmed to execute these cutting position operations. Currently, the final size of the first cut of a gear is obtained by making several extra cutting passes to avoid excessive cutting and to produce too small a gear. This results in current state-of-the-art procedures requiring the machine to be stopped between passes for the operator to make manual measurements to determine the required amount of cutter advancement for a final cut.

The present invention may further include monitoring of the axial position of the side faces of the gear in relation to the center and outside radius of the hob cutter. In the first cutting pass, the workpiece may be automatically positioned at a minimum distance above or below the cutter center as initial contact between the cutter and the workpiece occurs at the outside diameter. In this manner, further computer control of the hobbing machine may be attained to compute and control and vary the width and disposition of the teeth provided on the gear blank.

The computer control system of the invention in driving a variable speed motor provides control of the cutter's speed to attain the desired surface cutting speed to assure the proper amount of chip removal in conjunction with hob shift and the sharpness of the hob cutter and tooth cut size in relation to the material comprising the gear blank.

As will be recognized by those skilled in the art, the number of cutting teeth or gashes on the circumference of the cutter also influences the amount of material being removed per revolution of the hob cutter. The blank feed of the gear which is normally determined by the feed advance per gear revolution is controlled by the computer in accordance with the invention to achieve the desired shaving thickness per tooth. Once the computer is programmed with the number of teeth per hob circumference, the computer can calculate the amount of feed per revolution. Thereafter, the correlation of the cutter speed or power and rotational angular position in relation to gear blank feed and index can be utilized to vary cutter shift or cutter power or a combination thereof or gear blank feed and index within millionth's of a second to assure the calculated gear configuration is reproduced in the resulting gear.

The present invention is applicable to a wide variety of gears including worm gears in which a gear face length measuring device assists in determining the axial position of the hob cutter for the cutting of worm gears. The rapid travel of the hobbing machine can be used to position the blank against the cutter as required in the designed position of the gear center. As such, worm gears can be cut with the milling cutter tg make a low number of starts. The elimination of change gears simplifies the procedure for milling worm gears because the large number of gear starts heretofore required and the space availability have been reduced by the utilization of a variable speed electric motor coupled with the computer which monitors hob efficiency, angle and the cutting of the worm on the gear blank.

Computer and electric control of the hob cutter, workpiece rotation, as well as the motion of the workpiece past the cutter, results in more versatile hobbing machines which may be utilized to cut straight side teeth by use of milling cutters. Furthermore, application of a computer as the integral part of the hobbing machine allows the calculation of the gear design and a verification that the hobbing machine is actually cutting the gear as designed is provided by the optical encoder and computer interface. In addition, if at any time during the cutting of the gear, the design parameters are outside the limits set by the computer, the computer can be programmed to provide a printout of the deficiency and a proposed solution. The program and apparatus of the invention may also be designed so that cutting action will not again be initiated on the workpiece until an overriding button or additional instructions are programmed back into the computer.

In many instances, standard gears are utilized in production line equipment which do not always require a recalculation of their geometrical configuration. In addition, orders for such gears do not specify such things as tooth thickness or dimensions over pins or even outside gear diameter. In the cutting of such teeth on a gear, the final size is generally determined by the dimension over pins or caliper measurements over several teeth or center distance measurement with a master gear. In such cases, the present invention may be utilized wherein the circular tooth thickness will be calculated and printed to determine the cutting position of the hob cutter. The program of the computer may conveniently be designed to simultaneously calculate the distinguishing characteristics and parameters of the gear being cut, as well as the mating gear, so that the set of the gears can be cut to properly mesh on a given center distance.

The method of cutting gears in the preferred embodiment employs a computer into which certain cutter input information is programmed to provide the automatic system of gear cutting. This cutter input information may include supplying to the computer the following information:

1. Hob Outside Diameter
2. Dimension over pin
3. Pin diameter

4. Number of gashes
5. Hob lead angle
6. Hob diametral pitch
7. Hob pressure angle
8. Hob Tooth Whole Depth
9. Hob serial number
10. Hob number of starts
11. Hob direction of helix
12. Hob tip radius
13. Gear material
14. Desired shaving thickness In addition, certain basic parameters as to the specific type of gear to be cut are included in the input information and may be as follows:

1. Gear number of teeth
2. Normal diametral pitch
3. Nominal normal pressure angle
4. Working pressure angle
5. Helix angle
6. Direction of helix
7. Outside gear diameter Furthermore, information as to the mating gear may be programmed into the computer and may include:

1. Number of teeth in mating gear
2. Outside diameter
3. Center distance

With respect to the information on the mating gear, one other characteristic of the mating gear would be required. This information would be:

A. Dimension over pins and pin diameter; or
B. Desired normal tooth thickness; or
C. Standard tooth thickness.

From this information, the computer is equipped to calculate the preparation of a gear from a gear blank and to detect errors in setup. Furthermore, the computer may be programmed to provide a display of possible errors in setup such as:

1. Hob cannot be started. Face near tailstock is___ inches too close to tailstock.
2. Hob cannot be started. Face near spindle is too close to spindle. Add___ inch spacer.
3. Resharpen cutter. Cutter is too dull.

As a result of the computer controlled linear motion of the cutter and workpiece, it is possible to start the cutting action by cutter infeed, workpiece feed or combination of both. In addition, the rate of feed can also be varied. At the end of cutting, it is possible to dwell (no workpiece feed) while the cutter is in line with the end face of the gear. Shavings that are partially broken by the deburring tool can further be broken away by the gear cutter. The computer control over the linear motion of the cutter and workpiece travel makes it possible to obtain a coordinated motion that may be utilized in cutting a wide variety of gears and providing a number of different and involved precision machining of workpieces. As a result, the control system of the present invention allows:

1. A variation of the center distance between the workpiece and the cutter to provide cutting in both directions to produce crown hobbing;
2. A gradual variation of the center distance between the cutter and the workpiece in one direction only to produce a tapered gear; and
3. The movement of the hob cutter in and out in conjunction with a tapered hob as the workpiece is fed past the cutter to cut bevel gears.

As will now be recognized by those skilled in the art, a high degree of precision and reproducibility may be achieved by utilizing an electrically controlled variable speed feed and index drive in combination with a constant speed or the variable hob speed and hob shift and the monitoring of index and feed rates in relationship to cutter speed or power to achieve the advantages of the invention. It will be further recognized that the utilization of the electronic drive on the index mechanism allows the index mechanisms to be operated while the main drive is not operating. This provides a means for a better reindexing of a gear that may be subsequently returned to the machine in the event further machining or finishing is desired. This advantage may also be utilized in the event one face of the cutter leaves a rougher surface on one of the gear teeth due to the face angle of the gash in relation to the workpiece and the workpiece motion which may result in power surges or drops or other unusual conditions that might be encountered in hobbing operations. This feature of the invention can also be used to rotate the gear blank prior to the finishing cut to improve the surface finish.

It will be further recognized that having the ability to electronically rotate the indexing motor allows the operator to inspect the workpiece arbor concentricity prior to inserting the gear blank and provides a much safer environment as the cutter or other functions will not operate. In a mechanical drive the cutter and index drive rotate simultaneously.

In an alternative embodiment, the present invention may, with minor modifications, be adapted to bevel cutting equipment and shaper cutters. It will be recognized that in shaper cutters, the same aspects of the present invention are utilized but in a slightly modified form. In hobbing machines gears are cut utilizing a rotary motion, while a shaper cutter employs a reciprocal motion to provide the cutting action on the workpiece. As in the case of the hob, the present invention contemplates the computer control of variable speed electric motors and the measuring and monitoring of the power necessary to provide the reciprocal action of the shaper cutter. Furthermore, like the hob, the shaper cutter employs a similar optical encoder system or position sensor for monitoring the position of the shaper cutter and means for measuring the power necessary to provide the cutting action of the shaper cutter and correlating the power with variables such as feed, index and gear blank material to attain the predetermined gear profile.

The modification of existing shaper cutters in accordance with an alternative embodiment of the invention utilizes the main drive motor to provide for the reciprocating action of the cutter. Like the modification for existing hob equipment the mechanical linkages between the main motor and the feed and index drives are removed and variable speed electric motors with shaft encoders are substituted for the mechanical linkages. A position sensor or optical encoder is disposed on the shaper cutter shaft to provide pulses or information to the computer. The computer utilizes this information to vary feed and index drive rates. The term feed as used with respect to shaper cutters refers to shaper cutter feed or cutter indexing and not to in feed which is more properly center distance control and will be discussed in greater detail hereinafter.

The computer program for the shaper cutter like the program for the modification of existing hobbing machines varies index (workpiece) and feed drives (cutter index) until a predetermined unacceptably high rate of power consumption is used as detected by a Hall effect sensor or similar device is achieved at which time instructions are issued by the computer to resharpen the cutter of the shaper cutter. In such shaper cutters the mechanical linkage for providing cutter feed or indexing is replaced with a variable speed electronic motor for providing variable speed cutter feed or in essence changes in feed workpiece index drives in response to pulses received from the main motor drive. Shaper cutter feed like in hobbing machines is controlled and varied by the computer until the combination of feed and index rates indicate the cutter needs to be resharpened.

The shaper cutter in the cutting of spur gears or gears with straight teeth employs a reciprocating motion along a plane that is parallel with the center line of the gear. Indexing for the shaper cutter is provided for in a similar manner to the indexing provided for in the operation of the hob cutter. As in providing for indexing with the hobbing machine, it is necessary to calculate the number of teeth on each gear to obtain the proper indexing for the shaper cutter. Helical gears may also be cut by eliminating the traditional change gears and special cams heretofore employed and utilizing and correlating the variable speed electric motors for index (rotating the gear blank) and rotational drive of the shaper cutter as it reciprocates to match the angle of the desired helical gear. In the prior art, this action of the shaper cutter was achieved by utilizing a special set of cams inside the head of the shaper cutter. Each cam had to be precision made having an angle to match the angle of the helical gears being cut.

The prior art shaper cutters employed cams that were not only expensive but involved considerable machine down time when a change in helical angle was required. In the prior art utilization of cams in the shaper cutter, resulted in the shaper cutter head having to be disassembled to remove one set of cams to replace them with a new set of cams for a different angle. The application of the present invention to shaper cutters therefore not only provides a preferred shaper cutter but also eliminates the significant investment in making the set of cams and the tremendous amount of down time that was heretofore required in changing the cams for different angles.

The present invention provides not only for the elimination of the prior art cams but also replaces the change gears heretofore utilized by both the hobbing machines and shaper cutter to provide a more economical shaper cutter by using the novel method and control system for gear cutting machines. More particularly, in the application of the method of the present invention to shaper cutters, one or more sensors are employed to feed information into the computer as to the vertical position of the cutter to provide information to the computer to correlate with the rotational motion of the cutter necessary to generate the desired helical angle, and to move back on a reciprocating stroke on the same angle so that the cutter can start a new shaving, and a new cut. The computerized system of the shaper cutter includes a means for correlating the position of the cutter with the position of the gear and gives an angular rotation to the cutter. The need for specific helix angle cams are eliminated by the use of variable speed electronic drives that correlate the cutter's axial position with the helical angle position and with the teeth indexing position. In order to generate a particular angle of the helical gear, the computer controls and correlates the vertical position of the cutter and the angular position of the cutter. The angular motion is controlled by the rotation of a controlling disk mounted on the cutter support.

A further modification of the invention allows the shaper cutter to cut either spur or helical gears without the use of the traditional helical gear mechanisms heretofore employed in shaper cutters. This modification utilizes a mechanism in the shaper cutter to maintain the tooth relationship between the cutter tooth and the tooth of the gear. This mechanism can be arranged in much the same manner as has been utilized in the hob. One such means contemplates the control of one of the members such as the workpiece or the cutter by the computer based upon inputs from the sensor. The other member (either cutter or workpiece) would be driven to obtain indexing to a tolerance sufficient to provide the tolerance required in the gear cutting art. A second set of indexing mechanisms may be employed in order to generate only the helical angle in a similar way to the cams now being used, only this would be a computer controlled motion and would be achieved by utilizing electronically driven variable speed motors. In this embodiment, a vertical readout device or optical encoder similar to the one described with reference to the hobbing machine senses the vertical position of the cutter, and responds to signals to the computer to correlate the vertical position to the computer to compute the vertical position to the angular position of the helical gear. In this manner, as the cutter moves in an up and down stroke, the vertical part that reads the vertical position and feeds the signal to a rotating disc, that is mounted on the body that supports the cutter, and the signal from the vertical readout device and the signal from an angular position disc are fed into a computer that calculates and determines the angular position to provide the required helix angle.

On the return stroke from the cutting stroke, the cutter again travels in a reverse angular rotation to maintain the cutter in the proper angular position. Normally, shaper cutters for helical gears are made with the angle tooth of the cutter, at the same angle as that of the gear, and as a result it has been necessary to have a special cutter for just about every angle within the limits of several degrees. The present arrangement of the angular program that controls the position of the shaper cutter with the ability to go back and return over the path at which it moves at an angle to generate the gear results in a shaper cutter that cuts helical gears without the use of cams and eliminates the down time required to take one cam out and put another one back, in order to change the angle. Furthermore, the present method and shaper cutters constructed in accordance therewith provides versatility to a family of cutters, that can be used for a large number of angles.

The mechanical and electronic drive for making helical gears in the shaper cutter can be further simplified by unifying the workpiece and helix angle feed drives with the cutter drive system. Having the computer direct the rotational motion of workpiece and cutter enables the shaper cutter to calculate and direct the workpiece index rotation and cutter feed to provide the cutter rotation motion for index and helix angle with a single electronic drive.

In the preferrrd embodiment of gear cutters designed in accordance with the present invention the power necessary to cut gears that is monitored and controlled in accordance with the invention, is measured and controlled by measurement of the amperage required to drive the cutter. It will, of course, be recognized that other methods of measuring and controlling power input to the cutter will occur to those skilled in the art, such as by torque force measurments and the like, all of which are contemplated in practicing the method of the present invention. In the case of the hob cutter, the amperage of the hob cutter that is required to drive the cutter at a constant speed, is monitored and controlled, whereas in the case of the shaper cutter, the power necessary to operate the motor at a constant speed to provide the reciprocal movement is monitored and controlled.

Referring now to FIG. 1, reference character 20 denotes a hobbing machine and control system for cutting gears in accordance with the invention. The modified hobbing machine 22 includes a hob cutter 24 having a variable speed motor 26, a power supply 28 and control 30 is provided for driving hob shift for cutter 24. Control 30 is coupled to computer interface 34 via lead 36 to control the operation of the cutter to millionths of a second as heretofore described.

Power is provided for hob cutter 24 by an electrically driven motor 38, which similarly includes a control unit 40 and power supply 42 coupled to computer interface 34 via lead 44. A tachometer 46 is provided to determine the amount of hob shift utilized in the actuation of variable speed motor 38 and provide information to computer interface 34 via lead 48. Hob shift for cutter 24 in combination with inputs from the tachometer 46 and means for measuring and correlating power utilized in the cutting of the gear are modified in conjunction with feed rate as will hereinafter be described in greater detail to maintain the efficiency of the cutter. It will be recognized by those skilled in the art from the foregoing discussion that cutter speed and hob shift are also affected by cutter angle and also index and feed drive which are all preferably coupled with computer interface 34.

Hob cutter angle and hob cutter position with respect to blank gears 49 are controlled by drive means 50 and 52 respectively. Drive means 50 which controls the angular position of hob cutter 24 includes a drive motor 54, a power supply 56, and a control unit 58, which are connected to computer interface 34 by a lead 60. A tachometer 62 for providing computer interface 34 with the angular position of hob cutter 24 is also coupled with computer interface 34 via a lead 64. Similarly, the position of hob cutter 24 with respect to the center of gear blank 49 is controlled by drive means 52. Drive means 52 includes a motor 66 powered by a power supply 68 and a control unit 70. The control unit 70 is coupled to computer interface 34 via a lead 72, and a tachometer 74 for providing information to computer interface 34 as to the distance of hob cutter 24 is attached to computer interface 34 via lead 78 to provide data to the computer for setting up and maintaining the proper distance of the hob cutter to the center of gear blank 49. In this manner, the proper angular position and distance of the hob cutter 24 with respect to gear blank 49 is controlled and correlated by measurements of tachometers 62 and 74 in conjunction with the variable speed electrically driven motors 54 and 66.

Figure 2:
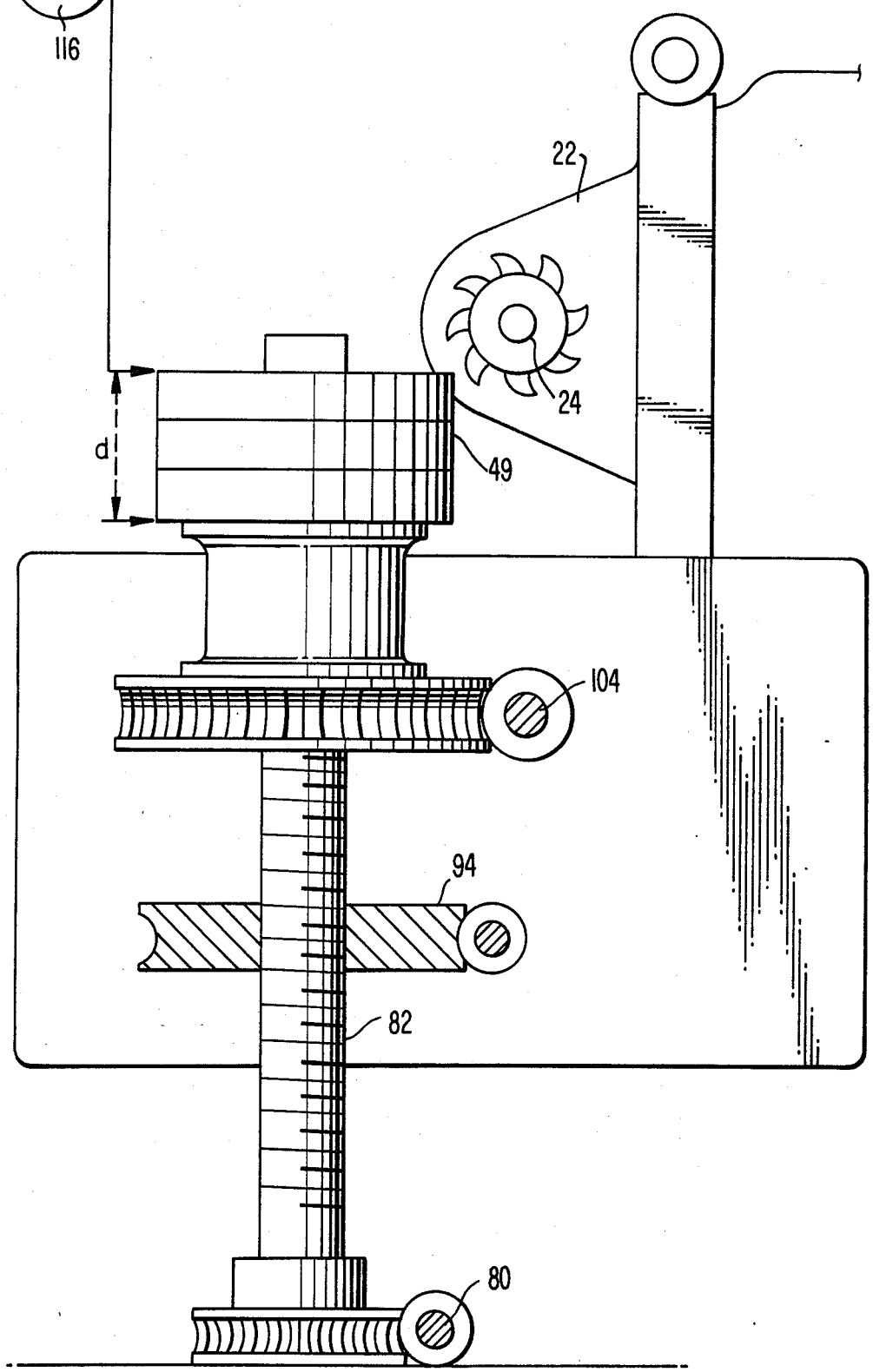
FIG. 2 illustrates a diagrammatic side view of a hobbing machine or the like of FIG. 1 illustrating the application of a computer and control system for measuring gear side faces to prepare gears of a configuration approaching the calculated optimum.
Figure 3:
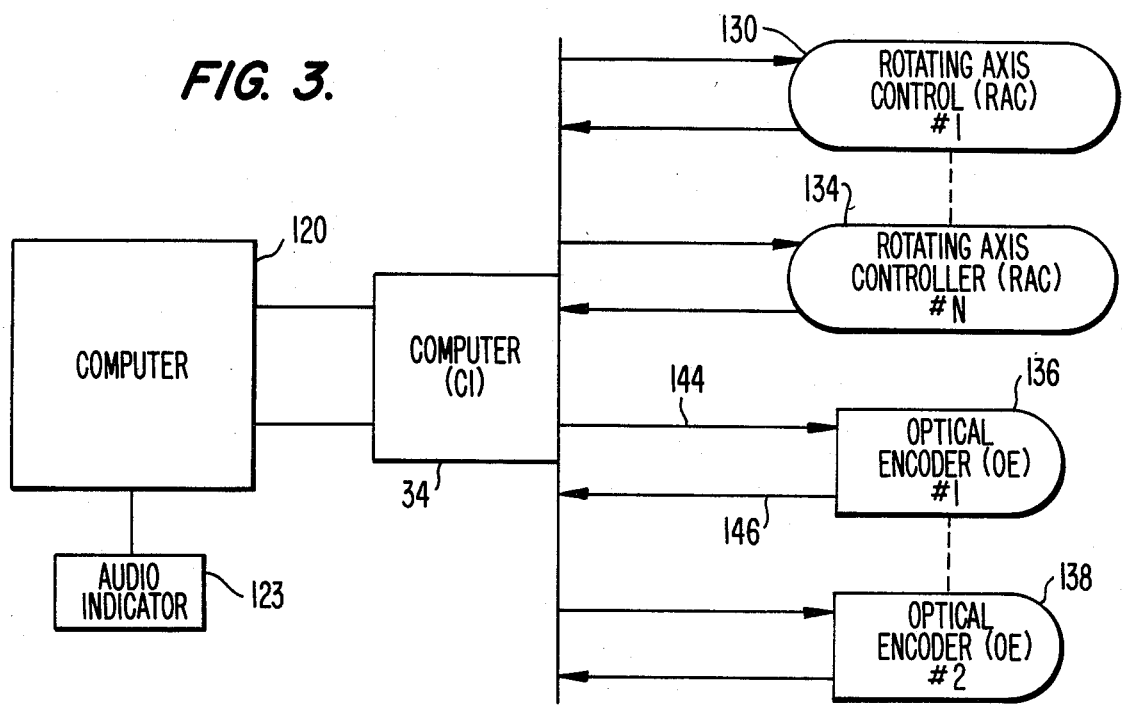
FIG. 3 is a diagrammatic layout of a suitable computer control means for controlling one of the rotational axes illustrated in FIG. 1.

Referring now to FIGS. 1 and 2, the feed of the gear blank 49 in relation to hob cutter 24 is illustrated. The rapid feed drive 94 of gear blanks 49 provides a fast vertical movement of blanks 49 for movement along inclined plane 82 that includes a rapid travel motor 96, a control unit 98 which includes a motor and brake control for a standard electrical motor 96. A brake unit 98 is connected to motor and brake control 100 which is operatively connected to computer interface 34 via lead 102 to provide, along with slow feed drive 80, information to computer interface 34 as to the vertical position of gear blank 49. Motor and brake control unit 100 is connected to computer interface 34 via lead 102. A tachometer and sensing device 101 for providing information to control the position of inclined plane 82 is connected to computer interface 34 and is provided via lead 103. In operation slow feed drive 80 is generally utilized to operate inclined plane 82 by utilizing a motor 84. Variable speed electric motor 84 includes a power supply 90 and a control 88 for controlling the feed of gear blanks 48 during the operation of the hob cutter. Control 88 is operatively connected to computer interface 34 via lead 92 to allow the computer to control the operation of feed drive 80 in conjunction with the operation of hob cutter 24.

An index drive 104 is provided for rotating the gear during the cutting operation to assist in the cutting of teeth on gear blank 49 which includes a variable speed electric motor, 106, a power supply 108 and a control unit 110 which is connected to computer interface 34 by a lead 112. Also interconnected between computer interface 34 and hobbing machine 22 is a lead 114 which includes a length measuring means 116 for determining the thickness of the length d of the side faces of gear blank 48 and monitoring the position of the starting and finishing faces of gear blank 48 as it is cut by hob cutter 24.

Computer interface 34 is preferably associated with a computer 120 which includes a keyboard 122 to receive information from the operator of the hobbing machine as to the type of gear to be cut, and a printer 124 and a cathode ray tube 126 to provide the operator with information as to machine set up, operation and the requirements of the machine such as for sharpening or replacement of the hob cutter or errors in positioning the tailstock and spindle to the gear face.

Referring now to FIGS. 3, 4, 5, 6, and 7, the computer 120 may optionally include an audio indicator 122 which may be a sonalart or speaker to provide an indication of errors resulting from improper machine operation. Computer interface 34 is associated with computer 120 to receive inputs and control each of the axis heretofore discussed with reference to FIG. 1. For the purposes of illustration, only one of the rotating axis control systems will be described, it will of course be understood that each of the rotating axes may be similarly controlled. In computer interface 34 rotating axis control 130, rotating axis controller 134, and optical encoders 136, and 138 are provided. The controller 134 may be any number of controllers available on the market and known to those in the computer art such as for example on 8030 controller manufactured by Aerotech, Inc. of Pittsburgh, Pa., motor (400) 137 with the serial loadcart (SL) 138 home control (EH) 130, voltage supply (SP) 140 and optical encoder 142 may all be components from Aerotech, Inc. with the model numbers appearing in parentheses. Each optical encoder such asa optical encoder 142 in FIG. 2 is designed to interface with computer interface 34 via leads 144 and 146 to monitor and provide information to the computer interface as to the progress of the gears being cut.

Figure 6:
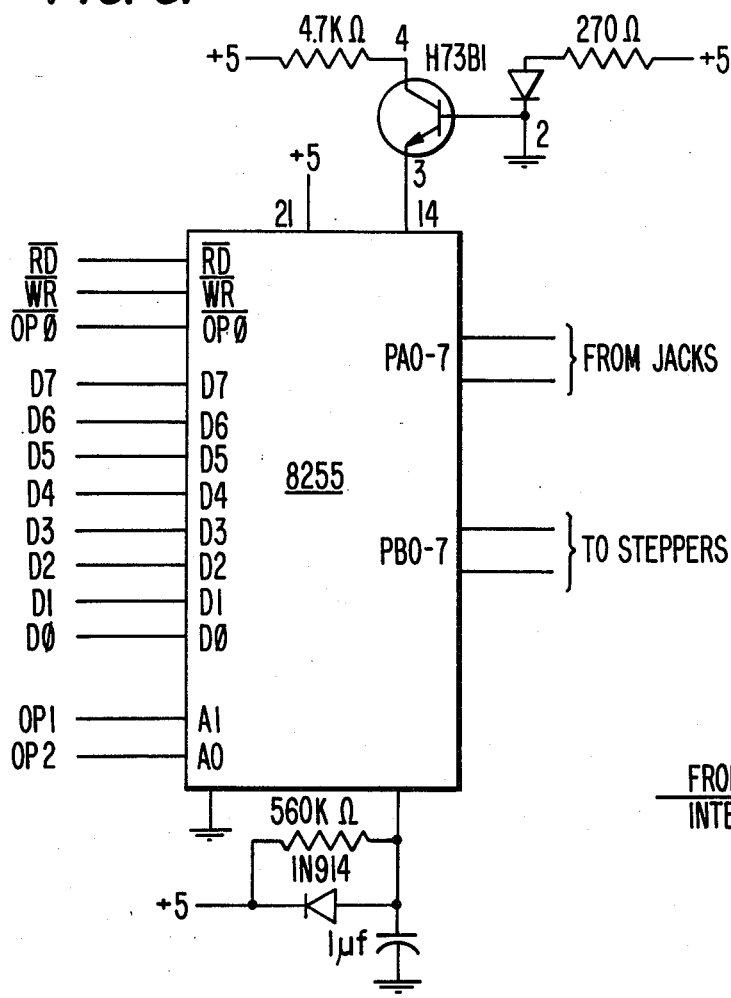
FIG. 6 is a diagrammatic layout further illustrating one particular format for the interface circuitry of FIG. 5.
Figure 7:
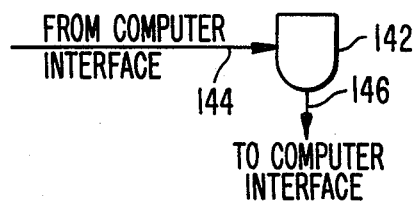
FIG. 7 is a diagrammatic layout of an optical encoder for fixed spread axis reference information.
Figure 4:
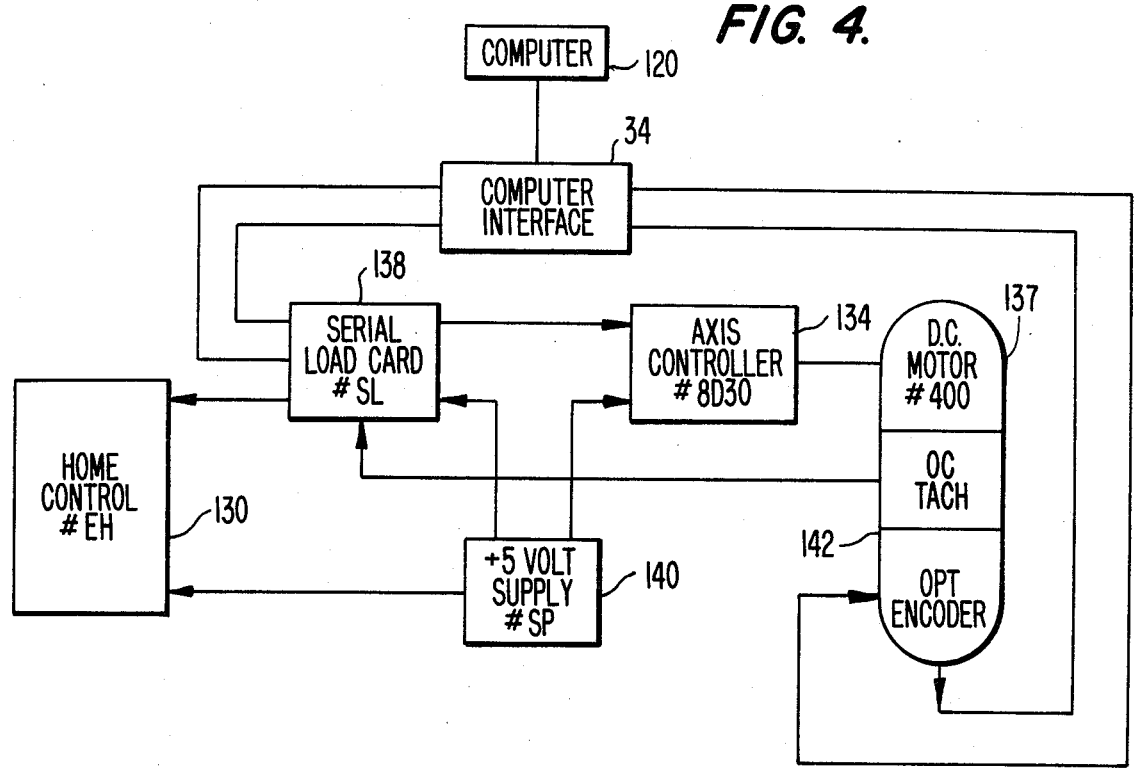
FIG. 4 is a flow chart illustrating the rotating axis control system and components for the control of one of the rotational axes as depicted in FIG. 1.
Figure 5:
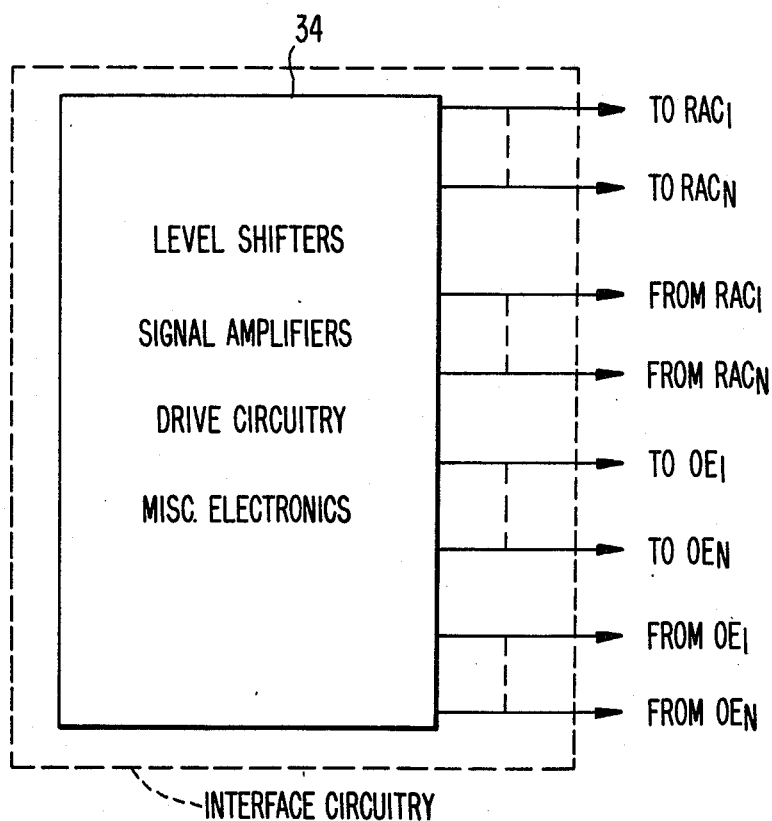
FIG. 5 is a flow chart of the interface circuitry of a computer system in accordance with the invention.

In FIGS. 5 and 6, the components of the computer interface 34 are more fully illustrated. In FIG. 6 the level shifters, signal amplifiers, drive circuitry are more fully illustrated. It will be recognized that a general purpose microprocessor of the type described are readily available on the market such as the PET model microcomputer manufactured by Commodore. A suitable computer interface includes an 8255 circuit such as manufactured by Commodore for each of the stepper motor controllers 134 and inputs from the control units 130.

Figure 8:
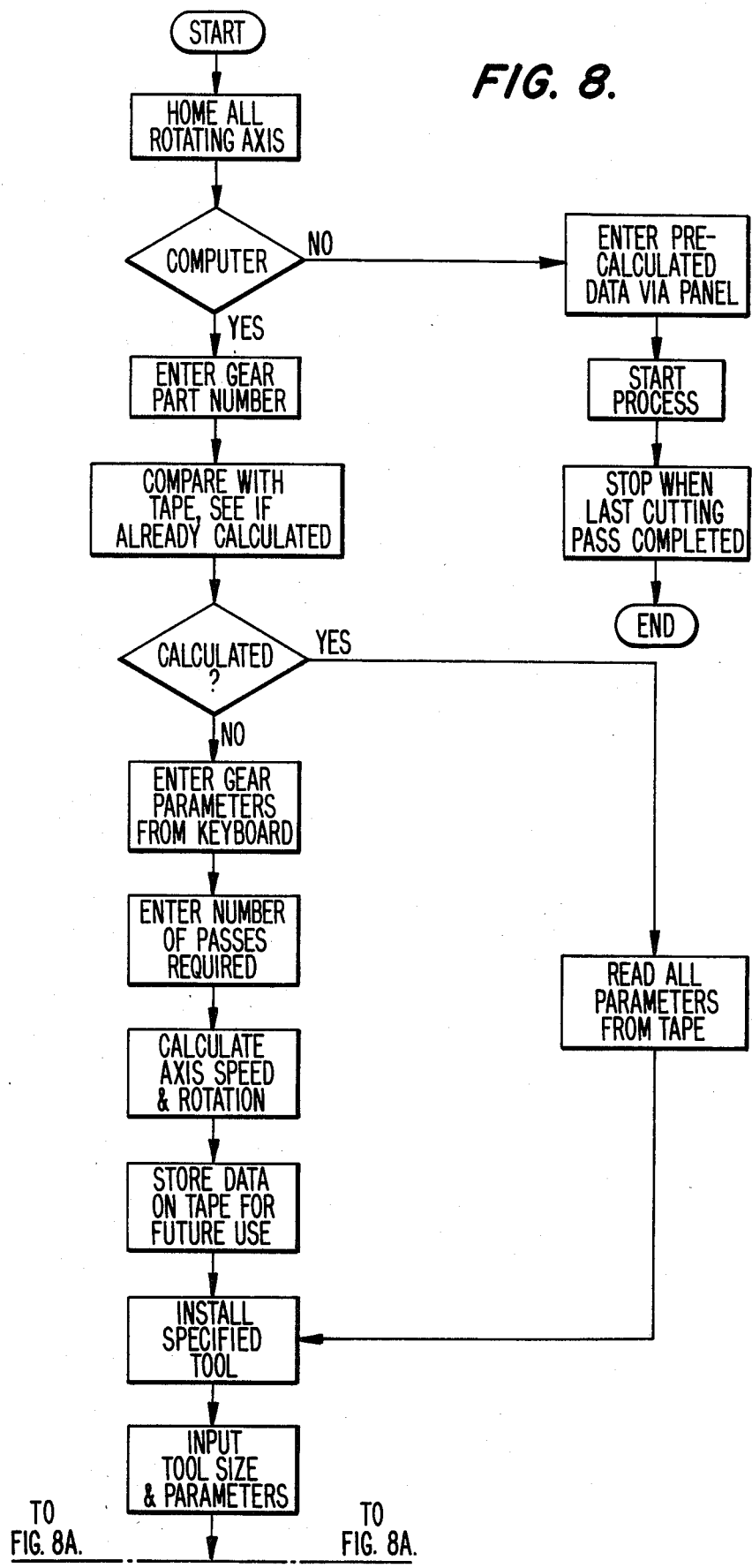

FIGS. 8 and 8A depict a general software which may be illustrated for the programming of the computer. The control system of the present invention may employ a tape or similar memory device to reproduce gears previously produced or calculate the set up for producing a new gear having the desired qualities by utilizing hobbing machines and the method of hobbing of the present invention.

Figure 9:
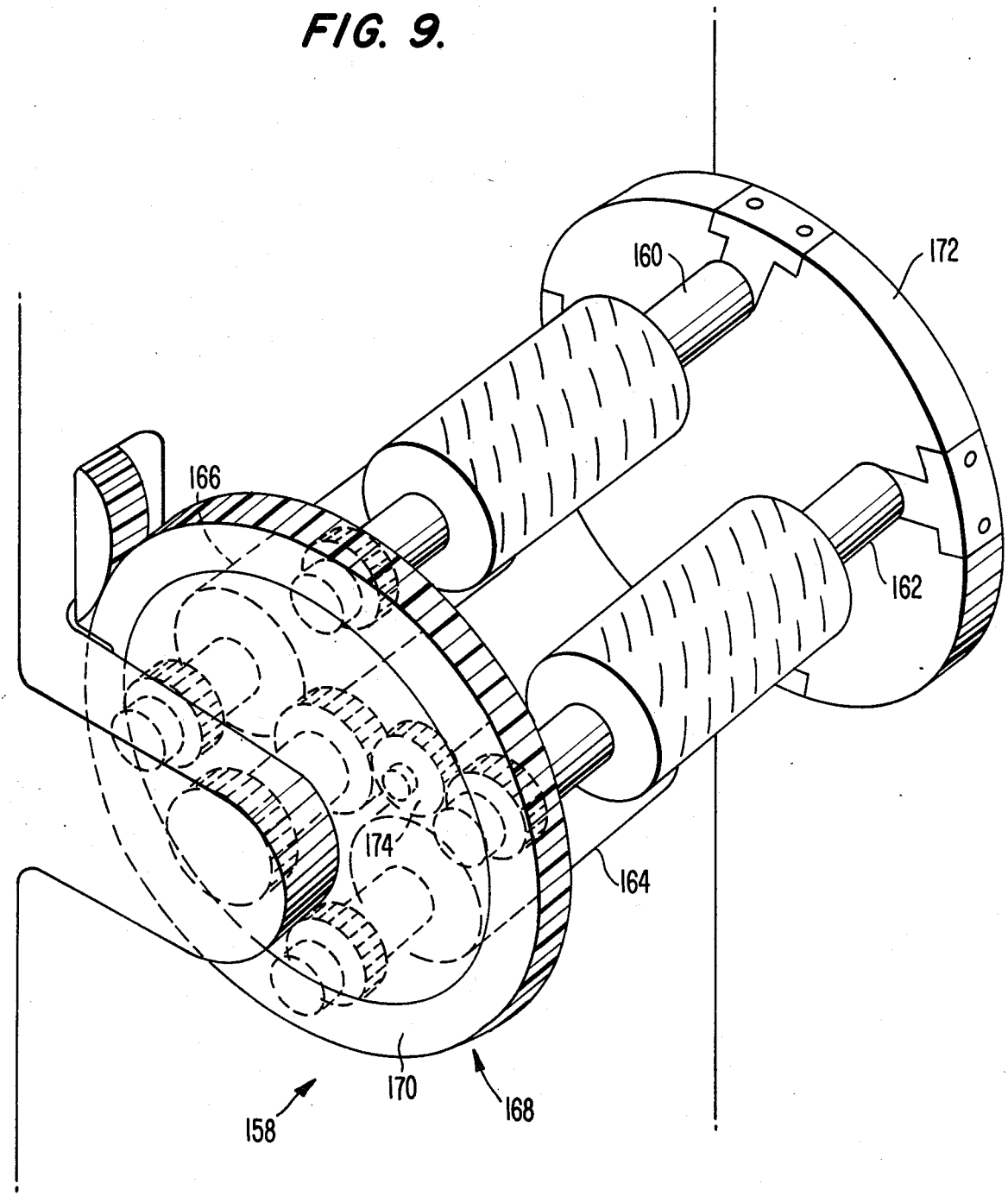
FIG. 9 is a perspective view of multiple hob cutters mounted on a ring for hobbing in accordance with an alternative embodiment of the invention.

Referring now to FIG. 9, a hob cutter 158 further modified in accordance with the invention is illustrated wherein a plurality of hob cutters 160, 162, 164 and 166 are mounted to a hob cutter ring 168. Hob cutter ring 168 includes two disk like members 170 and 172 for axially positioning the plurality of hob cutters 160, 162, 164, and 166 with respect to the workpiece. Once the hob cutter is in the proper axial position with respect to the workpiece as for example cutter 162, a cutter drive 174 engages cutter 162 and monitors and controls power input and hob shift in conjuction with the number, type and material from which the gear is being cut as heretofore described in accordance with the invention.

Hob ring 168 may be designed to fit into an existing hob cutter 22 (FIG. 1) or a larger hob cutter frame designed to accomodate hob rings of various sizes. In the preferred embodiment of the hob cutter ring 168 means is provided for adding or removing hob cutters at about the position of hob cutter 166. Cutters 160, 162, 164 and 166 can be of the same size, where speed of production is required in cutting gears or may be of different sizes. The utilization of different sized cutters on hob cutter ring 168 provides a more efficient hobbing machine where more than one set of gears having a different size and number of teeth are to be cut on a gear blank. In such instances, the computer can be programmed to cut both sets of gears and, after the first set of gears are cut, the computer is programmed to direct the rotation of the ring to place a second cutter in contact with the gear blank to begin cutting the second set of teeth.

Figure 10:
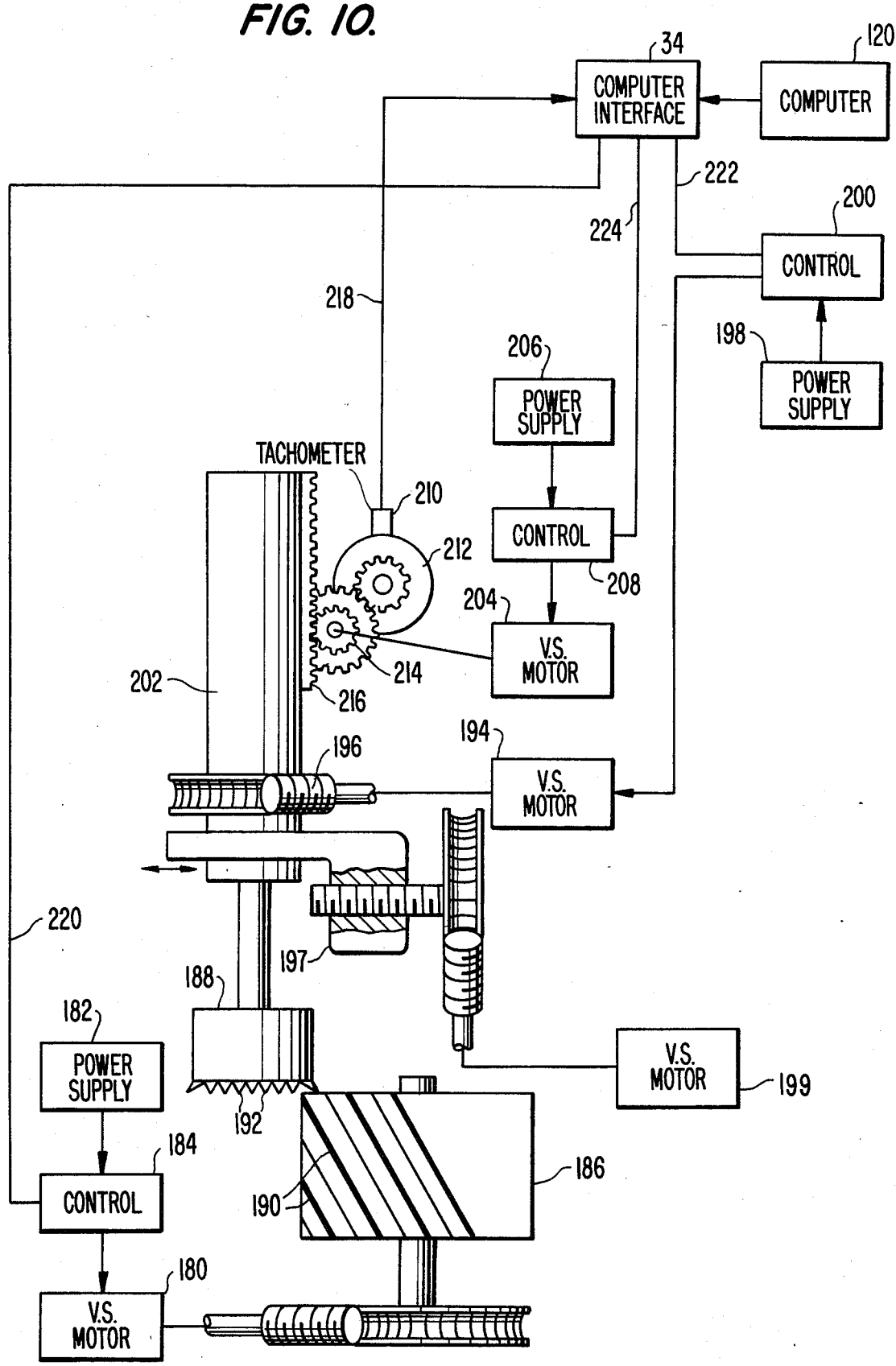
FIG. 10 is a diagrammatic illustration of a shaper cutter depicting the application of a computer and control system to a shaper cutter in accordance with the invention.

FIG. 10 illustrates the application of the method of cutting gears to a shaper cutter designed in accordance with a preferred embodiment of the invention employing a variable speed cutter and power measuring servo-controller. The shaper cutter, like hobbing machines designed in accordance with the invention, includes a variable speed electric motor 180, a power supply 182, and a servo-controller 184 similar to the one illustrated and described with reference to FIGS. 1 and 4. Controller 184 provides for a variable rate of rotation of gear workpiece 186 in response to the type of teeth being cut by the shaper cutter, the machinability of the material of the gear blank and measurements of power utilized in the operation of cutter 188. The operation of the cutter 188 of the shaper cutter forms teeth 190 on gear blank 186 by a combination of the rotation and reciprocal motion imparted to teeth 192 on the cutter 188. The rotational component for teeth 192 is provided by variable speed motor 194 which provides a controlled electrically activated rotation of the shaper cutter assembly 196. A variable power supply 198 and a control unit 200 provides means for varying and controlling the speed of rotation of cutter 188 within millionths of a second as heretofore described in reference to the invention.

The combination of the relative speeds of rotation of cutter 188 and gear blank 186 and the axial motion of cutter 188 are employed to attain the desired helical angle for the gear blank. It will be recognized by those skilled in the art that when a zero helical angle is required gear blank 186 and cutter 188 are rotated at a coordinated speed such that gear blank 186 and cutter 188 are rotated at the same speed where the diameter of cutter 188 and gear blank 186 are the same and modified where the diameters are different to provide the same relative motion. The control and coordination of control 200 for variable speed motor 194 and of control 184 for variable speed motor 180 are controlled by computer 120 through computer interface 34 to produce gears of a desired helical angle and of a preferred configuration.

The reciprocal motion of the shaper cutter 202 is provided by an electrically activated variable speed motor 204 including a power supply 206 and a control unit 208 for monitoring and measuring the power necessary to provide reciprocal movement to cutter 188 of shaper cutter 202. It will now be recognized from the description of the present invention that as teeth 190 are cut on gear blank 186 teeth 192 on cutter 188 became dull and as a result more power is required to operate cutter 188 at the same efficiency. The amperage or power required to operate cutter 188 in conjunction with the helical angle, the number and depth of cutter starts and gear material along with comparative information as to cutter power required when the cutter 188 was new provides computer 120 with information from which to compute cutter sharpness. In addition, the variable power supply may be modified by the computer to increase or decrease power and/or workpiece feed when necessary to compensate within predetermined parameters the power necessary to maintain a uniform or predetermined cutter operation. In the preferred embodiment of the invention indexing is provided for within millionths of a second by the shaper cutter but reciprocal power is maintained at a predetermined maximum and when the power required to operate the cutter reaches maximum amperage, the computer issues instructions to replace or resharpen cutter 188.

The vertical position of cutter 188 with respect to gear blank 186 may be monitored in a variety of ways known to those skilled in the art. One method is to provide a tachometer 210 which may be mounted to a gear 212 in order to monitor the axial position of gear 214 which is driven by variable speed motor 204. It will of course be recognized that one method of providing reciprocal motion of cutter 202 is though a crank arm in which the position of the shaper cutter can be sensed by the axial rotation of gear 214 by motor 204 in a rack 216 associated to shaper cutter 202.

In a manner similar to the one described with reference to the hobbing machine the tachometer 210 can monitor and transmit information as to the vertical position of the shaper cutter 202 to the computer interface 34 via a lead 218. Similarly information to and from control units 184, 200 and 208 are connected to computer interface 34 via leads 220, 222, and 224 respectively. The operation and control of variable speed motors 180, 194, and 204 is correlated with information provided by tachometer 210, and the amperage monitored by control 208 and in conjunction with the information as heretofore described allows teeth 190 to be cut on gear blank 186. The collection of the aforementioned information as to the actual cutting of the gear in conjunction with comparative information stored in the computer memory allows computer 120 operatively connected to computer interface 34 to correlate the power necessary to operate cutter 188 with the number and depth of teeth 190 being cut on workpiece 186 to provide gears of superior configuration.

Referring now to FIG. 11 one form of a cutter power sensor circuit of a type known to those in the art is illustrated in which a Hall effect current sensor 230 is operatively connected to a cutter drive motor 232 which may for example be an electrically controlled variable cutter drive speed motor such as 38 for hob cutter 24 of FIG. 1 or shaper cutter support 202 of FIG. 10. Hall effect current sensor 230 is also operatively connected to a variable power supply 234 and an analog to digital converter 236 which is part of computer interface 34 and which has as heretofore been described is operatively connected to computer 120.

The shaper cutter designed in accordance with the invention allows a wide variety of gears to be constructed in accordance with the present invention such as internal gears, spur gears or gears with straight teeth. The set up and programming of the shaper cutter is similar to the set up of the hob cutter as heretofore described in relation to rotational axis control and measuring devices for determining the position of the cutter in relation to the gear blank and the programming of the computer to determine the last position of the cutter to provide a more uniform gear by monitoring and controlling power and cutter shift in relation to the material of the gear blank.

In an alternative embodiment of the invention existing gear cutting machines can be conveniently converted to provide the advantage of a computer controlled gear cutter. It will be recognized that existing gear cutters such as hobbing machines and shaper cutters can be modified by providing or converting the electric main motor into a variable speed motor and providing a means for measuring and varying the power utilized to drive the cutter. The index drive and feed drive is as has heretofore been described is independently controlled with variable speed electric motors.

It has been discovered that the modification of existing gear cutting machines may be modified to attain the advantages of the invention more readily by utilizing the main motor to drive the cutter and removing the linkages between the main motor and the index and feed drives and attaching variable speed electric motors to the shafts responsible for driving feed and index. A shaft encoder or pulse counter is then attached to the main motor to provide information to the computer as to the cutting position of the cutter so the variable speed feed and index motors may be varied to achieve or duplicate a predetermined calculated or actual optimal gear configuration. It will be recognized that additional drives such as cutter shift may be driven from the main motor. In the preferred embodiment each of the additional drives are separately controlled so that greater control and accuracy in the cutting of the gear may be achieved.

The benefits of the present invention are optimally achieved in modifying existing gear cutting machines by changing belt driven drives to a positive drive system employing gears. Therefore in those existing machines employing belts or hydraulic drives it is preferable to replace the existing drives with a geared drive from the main motor to eliminate errors due to belt slippage or time lags. A positive drive system in conjunction with pulse readings from an encoder attached to the main motor shaft can then be utilized to provide the computer with information as to the cutting action of the cutter. It will be understood that the advantages of the invention could be achieved by attaching a shaft encoder directly to the cutter and thereby utilize existing belt or hydraulic drives to achieve the advantages of the invention. At the present state of the art it is preferable to attach the encoder to the main motor shaft in view of the limited number of pulses obtainable from the cutter compared with the greater number of pulses from the main electric motor due to differences in rotational speed and the resolution of currently available encoders.

The modification of existing gear cutters in accordance with an alternative embodiment of the invention is achieved by utilizing the main motor to drive the cutter and providing variable speed electric motors to control feed and index rates. Existing shaper cutters and hobbing machines both with and without cutter shift capabilities can be readily modified by employing much the same principles that will first be discussed with reference to hobbing machines and then shaper cutters.

Figure 12:
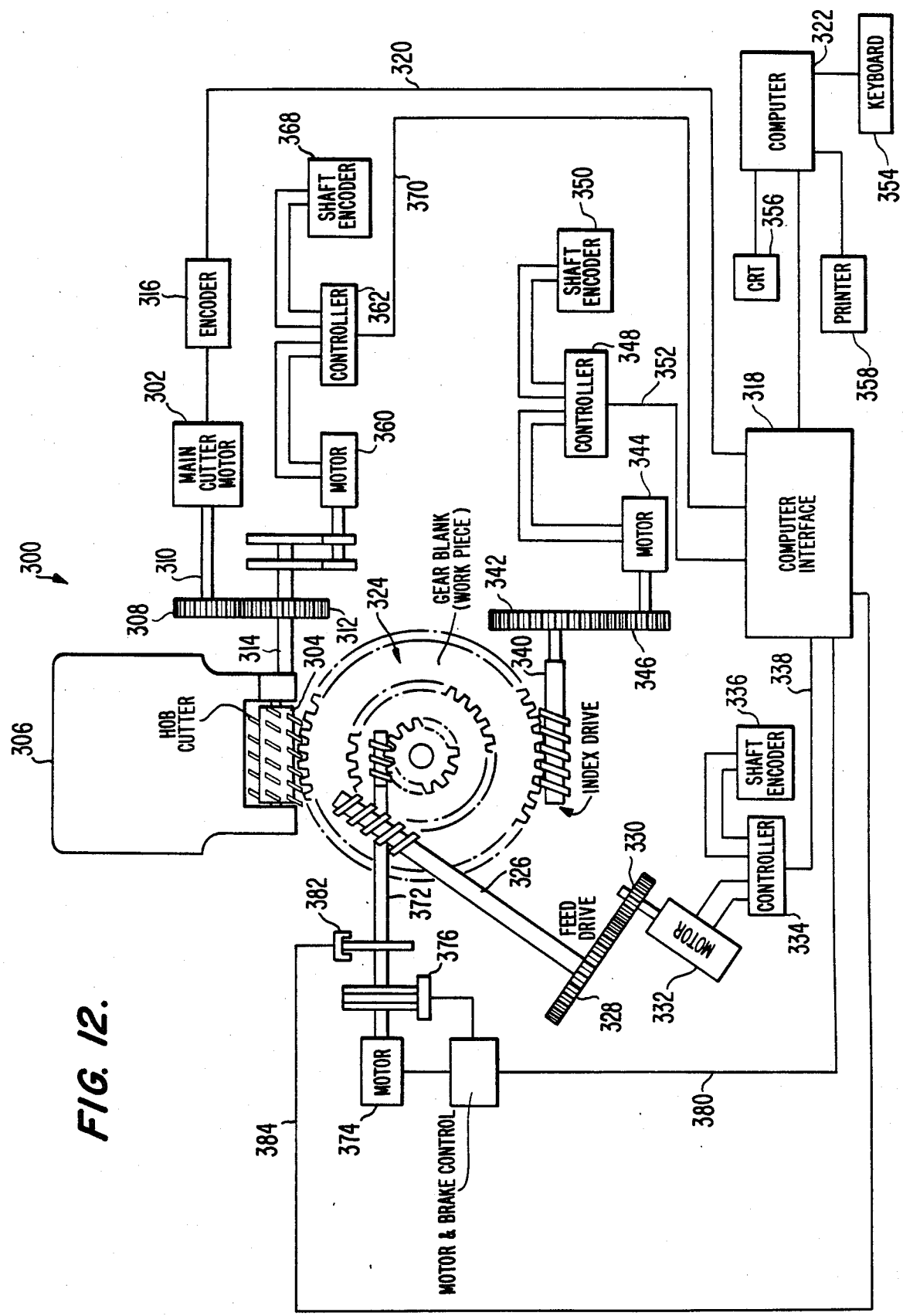
FIG. 12 is a diagrammatic illustration of one form of an existing hobbing machine or the like depicting a further embodiment of the application of a computer and control system to an existing hobbing machine in accordance with the invention.

Referring now to FIG. 12 a simplified diagrammatic top plan view of an existing hob machine is employed to illustrate a modification of an existihg hobbing machine in accordance with the invention. The hobbing machine control system 300 employs the existing main cutter motor 302 to drive hob cutter 304 disposed in hob cutter head 306. In the event the existing prior art hobbing machine includes a belt or hydraulic drive between the main motor and cutter, the existing drive is replaced by a gear drive by mounting a gear 308 on the drive shaft 310 of main motor 302. A mating gear 312 is provided on input shaft 314 to the hob cutter 304 to provide a positive linkage between the hob cutter 304 and the drive shaft 310. A cutter shaft encoder 316 and Hall effect sensor (not shown) to measure power is mounted to drive shaft 310 to provide information to the computer interface 318 via lead 320 as to the rotation of the cutter and main motor cutting power from which computer 322 can utilize to compute and vary variable speed feed and index drives within millionths of a second to maintain a predetermined cutting program.

In existing hobbing machines the main cutter motor 302 is generally an AC motor to which an available shaft encoder 316 such as for example, a Trump Ross Encoder No. SSO Model 200 5LVF6B1 manufactured by Datametrics, Inc. can be mounted to the shaft of the main cutter motor. Computer 322 may be a commercially available computer such as for example, a Rockwell AIM 65 computer as is available on the market. It will be understood that other available computers may be employed to achieve the advantages of the invention and that more sophistocated computers with more functions are contemplated when a number of drives are to be coordinated in relation to pulses received from shaft encoder 316.

The mechanical linkages between the main cutter motor 302 and the feed and index drives are modified so that the change gears are replaced by variable speed electric motors to allow changes in feed and index drives in response to pulses received from main cutter motor 302 during the cutting of the gear. The feed of a gear blank 324 in relation to hob cutter 304 is provided by feed drive 326 for feeding workpiece 324 to hob cutter 304. The gear 328 for feed drive 326 in existing hobbing machines is utilized and driven by gear 330 provided on a variable speed electric motor 332 which has been added to replace the traditional change gears. Variable speed electric motor 332 includes a controller 334 and shaft encoder 336 which are connected to counters in computer interface 318 via a lead 338 to provide a two way electrical signal buffering between the computer 322 and the computer interface 318 electronics.

In a similar manner, the index drive 340 utilizes an existing gear 342 to attach a variable speed electric motor 344 having a gear 346. Variable speed electric motor 344 like variable speed motor 332 replaces the change gears to provide the advantages of instantaneous correction in the cutting of gears by varying index drive and/or feed drive in response to pulses measured by encoder 316 and powe measurements from a Hall effect sensor and predetermined values necessary for the cutting of an ideal gear. Variable speed electric motor 344 includes a controller 348 and shaft encoder 350 which are similarly connected to computer interface 318 by a lead 352 to provide two way electrical signal buffering between the computer 322 and the computer interface 318.

Computer interface 318 is associated with computer 322 and preferably includes a keyboard 354 to receive operator inputs as a result of computer prompts displayed on the cathode ray tube 356 to receive and confirm information as to the type of gear being cut. The computer can be programmed to provide the operator with information as to machine set up, operation and the requirements of the machine such as for example, when the machine requires replacement or resharpening of the cutter or of errors in the positioning of the gear blanks. An optional printer 358 and recorder may be provided to print the information as to the set up of the machine or record the cutting conditions to allow for ease of duplication of the gear or cutting conditions for a future occasion.

The controllers 334 and 348 may be of a number of types of controllers available on the market and known to those in the computer art such as for example, an 8030 controller manufactured by Aerotech, Inc. of Pittsburgh Pa. Variable speed electric motors 344 and 332 may also be obtained from Aerotech as motor (400) with a serial loadcart (SL) home control (EH) voltage supply (SP) and optical encoder which have been described with the model numbers appearing in parentheses.

In existing hobbing machines having hob shift capabilities the hobbing machine may be further modified in accordance with the invention to provide the additional advantages resulting from varying hob shift by employing a further variable speed electric motor controlled by computer 322. In FIG. 12, the modification of an existing hobbing machine having hob shift capabilities is illustrated wherein variable speed electric motor 360 is controlled by controller 362 and a shaft encoder 368 which is connected to counters in the computer interface 318 via a lead 370 to provide a two way electrical signal buffering between the computer 322 and the computer interface 318.

A few existing gear cutting machines employ a rapid travel motor that may also be controlled by the computer in accordance with the invention. An optional rapid feed drive 372 for gear blank 324 is also illustrated in FIG. 12. The rapid feed drive 372 provides for a rapid travel of the gear blank 324 to hob cutter 304 to reduce set up time. In some hobbing machines the existing rapid travel motor 374 can be utilized by adding a control unit 376 which includes a motor and brake control for a standard AC motor. A motor and brake control unit 378 is operatively connected to counters in computer interface 318 via lead 380 to provide along with feed drive 326 information to the computer interface 318 as to the vertical position of gear blank 324. A tachometer and sensing device 382 may be provided to provide information to coordinate and control the position of the gear blank 324 with respect to hob cutter 304. Tachometer and sensing device 382 is connected to counters in the computer interface 318 by lead 384 to provide a coordinated control of rapid and cutting feed drives.

In some existing hobbing machines drives exist for changing hob cutter angle and hob cutter position with respect to the gear blanks. It will be understood that these additional drives may be controlled by the computer as has been described with reference to FIG. 1 and as will be hereinafter be partially discussed with respect to FIG. 13.

Figure 13:
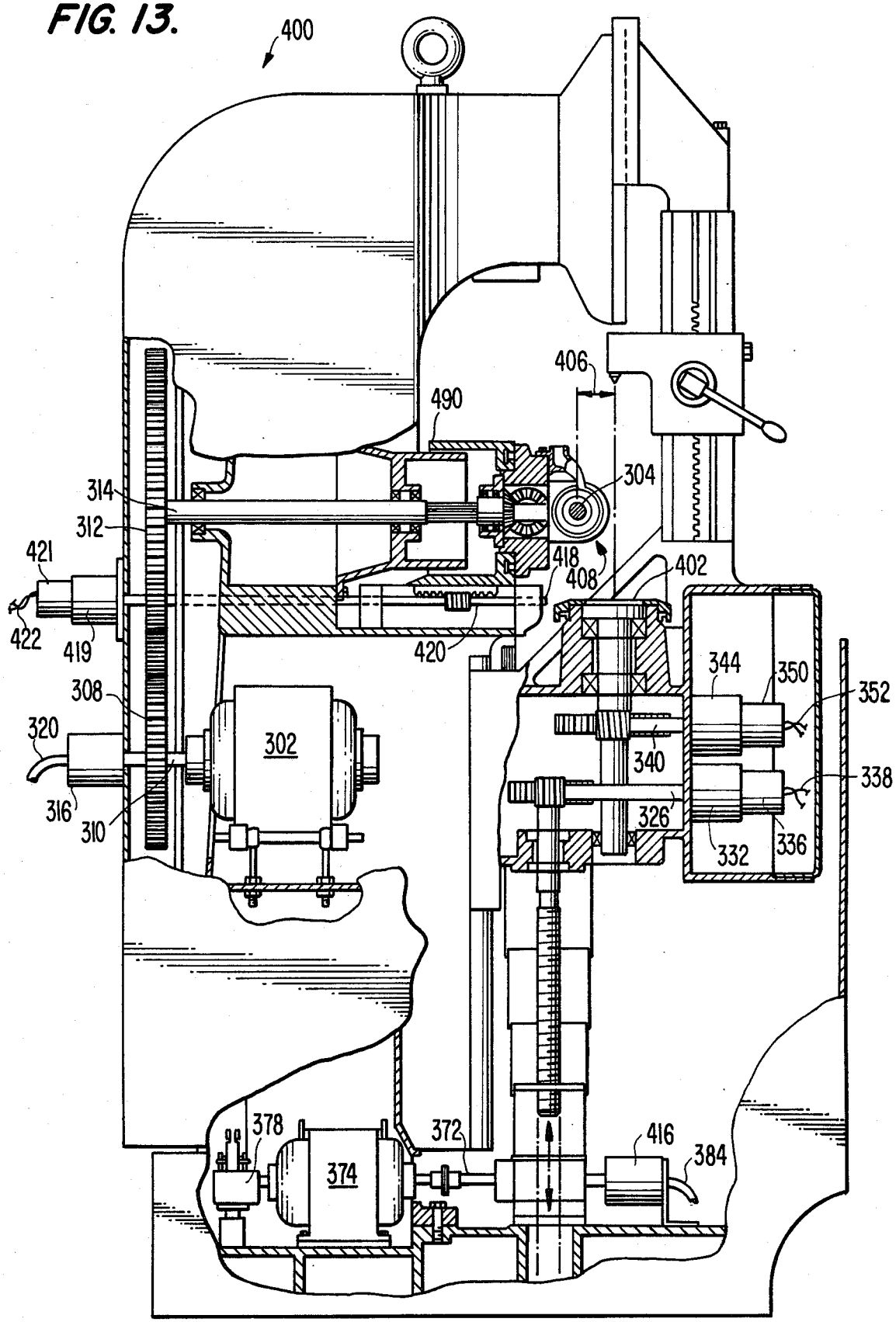
FIG. 13 is a front elevational view partly in section illustrating an addition and disposition of variable speed electric motors and encoders in accordance with one embodiment of the invention.

The modification of an existing hobbing machine to achieve the advantages of the invention will now be discussed with reference to FIGS. 12, 13, 20, 22, 23 and 24. In FIG. 13 an existing Cleveland type hobbing machine is illustrated that has been modified in accordance with the invention. Hobbing machine 400 utilizes existing main cutter motor 302 in which the pulleys and belts connecting motor shaft 310 with hob cutter shaft 314 have been replaced by a gear 308 on shaft 310 and a gear 312 on shaft 314 to provide a positive drive for hob cutter 304. An encoder 316 is mounted to shaft 310 to provide information to the computer as to the cutting progress of hob cutter 304 via lead 320.

A Variable speed electric motor 332 replaces the change gears which were utilized to provide a fixed rate of feed in relation to the drive provided through linkages to main cutter motor 302. Variable speed electric motor 332 is attached to feed drive 326 for vertically feeding gear blanks placed on rotary table 402 with respect to cutter 304. Variable speed electric motor 332 utilizes a controller 334 (Fig.12) and shaft encoder 336 (FIG. 13 ) to provide information to computer 322 via a lead 338.

In a similar manner a variable speed electric motor 344 is mounted to index drive 340 in place of the traditional change gear linkage to the main motor 302 to rotate table 402. Variable speed electric motor 344 similarly employs a controller 348 (FIG. 12) and shaft encoder 350 (FIG. 13) to provide information to computer 322 via lead 352. The information provided by encoder 316 as to the cutting position of cutter 304 allows computer 322 to vary index and feed rates to maintain a predetermined cutting action by cutter 304 to produce gears of an improved configuration to more closely approach the calculated theoretical configuration.

Figure 14:
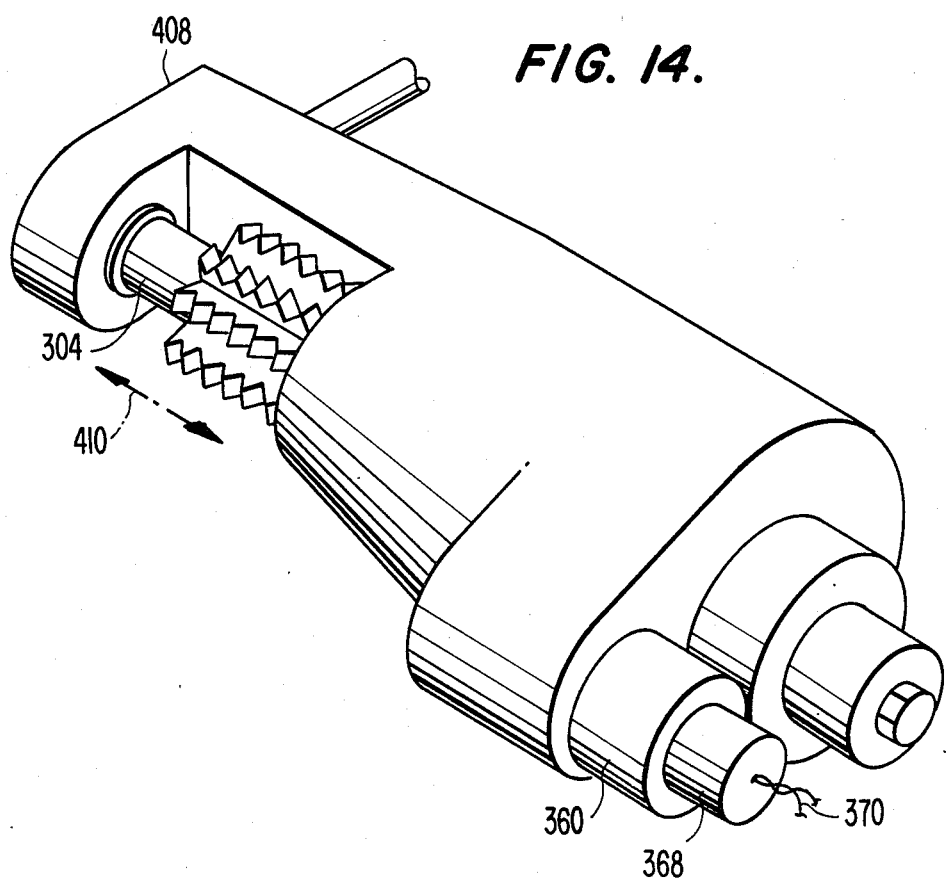
FIG. 14 is a perspective view from the rear of a portion of the hob cutting element of the hobbing machine of FIG. 13 illustrating a modification of the hob shift mechanism to provide computer controlled hob shift in accordance with a preferred embodiment of the invention.
Figure 15:
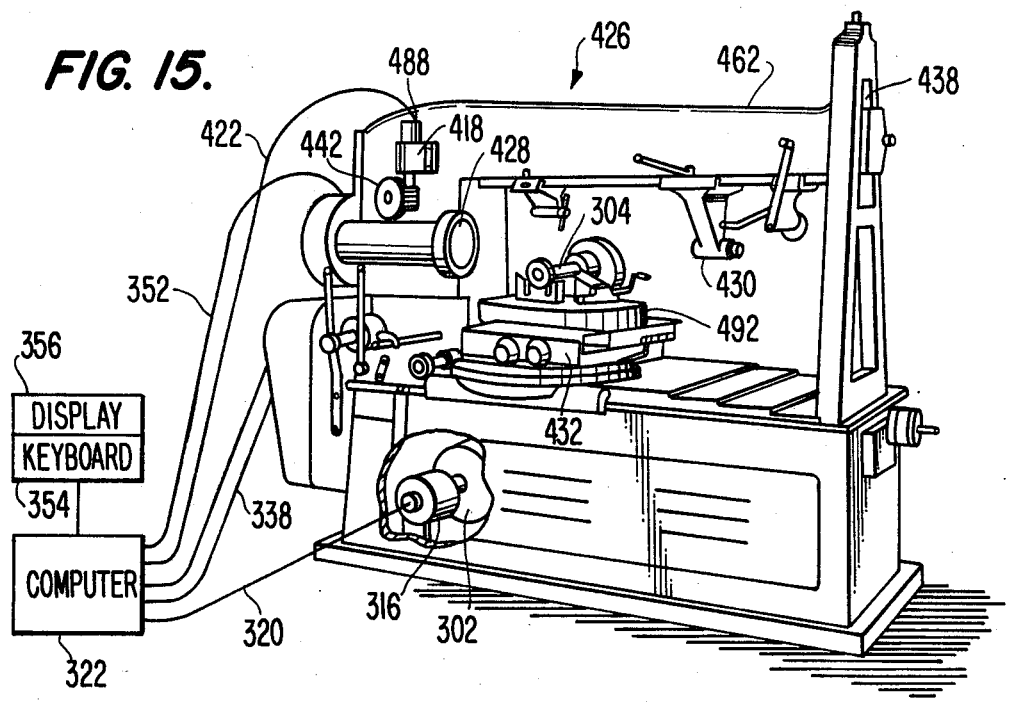
FIG. 15 is a perspective view from the front of another type of an existing hobbing machine partly in section illustrating an addition and disposition of variable speed electric motors and encoders to modify the hobbing machine in accordance with the invention.
Figure 16:
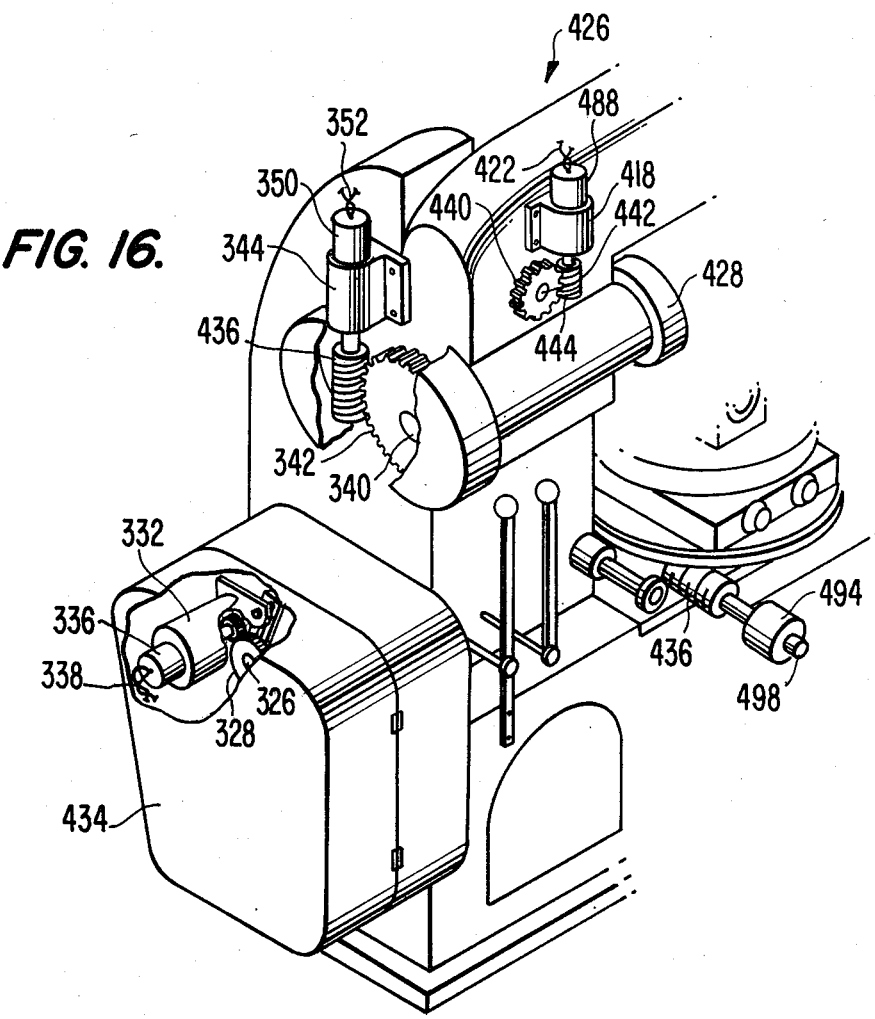
FIG. 16 is a side elevational view partly in section illustrating an arrangement for a disposition of the encoder and variable speed electric motors of the hobbing machine of FIG. 15.
Figure 17:
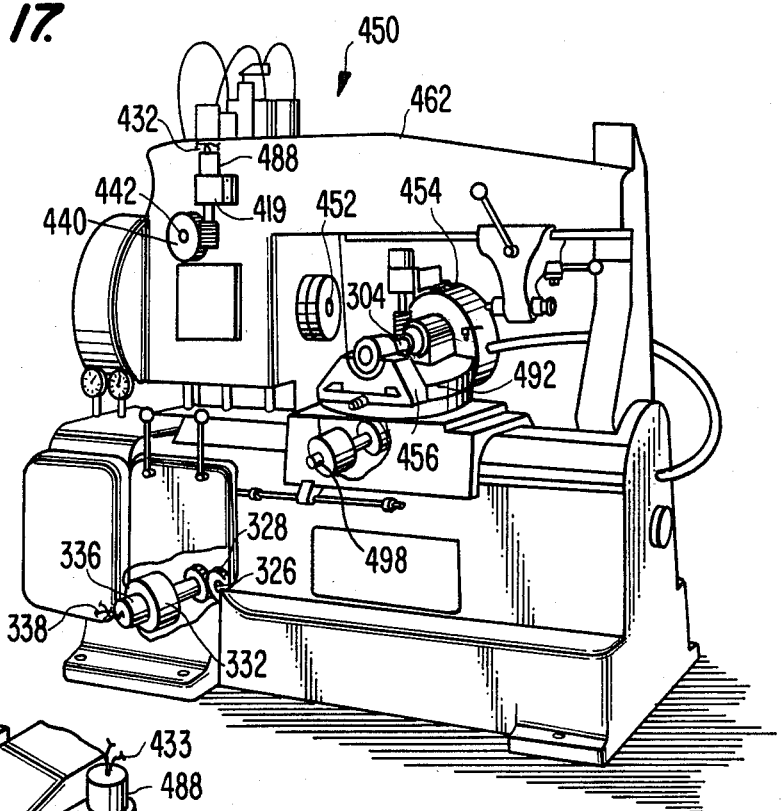
FIG. 17 is a perspective view from the front of a further type of existing hobbing machine illustrating the combination and disposition of variable speed electric motors and encoders to modify the hobbing machine in accordance with the invention.
Figure 18:
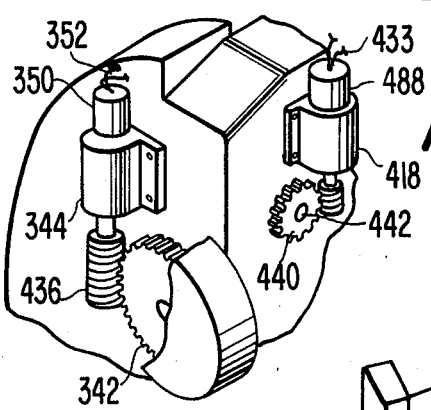
FIG. 18 is a side elevational view partly in section illustrating an arrangement and disposition of encoders and variable speed electric motors of the modified hobbing machine of FIG. 17.
Figure 19:
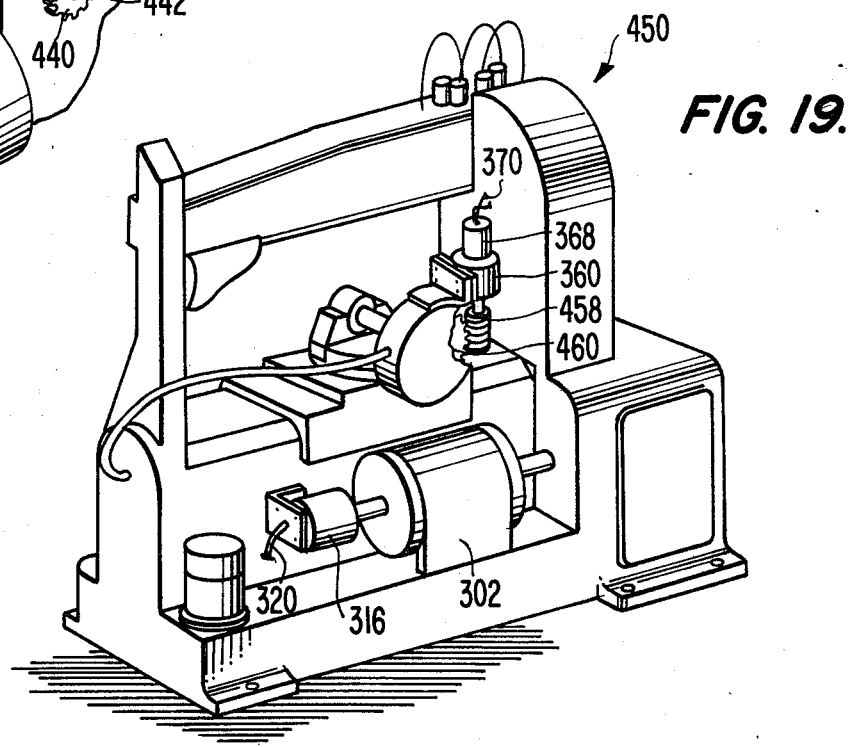
FIG. 19 is a perspective view from the rear of the hobbing machine of FIG. 17 illustrating the main drive motor and modification of the hob shift to provide a computer controlled hob shift in accordance with a preferred embodiment of the invention.

Hob cutting machine 400 includes a hob shift feature which may be conveniently utilized in a preferred embodiment of the invention to further improve the accuracy of gears produced and increase hob cutter life. Hob cutter 304 is mounted in hob head 408 (FIG. 14) to provide axial shift in the direction of arrow 410 in response to manual actuation by a handle (not shown) which has been replaced by a variable speed electric motor 360 having a controller 362 (FIG. 12) and shaft encoder 368 (FIG. 14) to provide information to computer interface 318 and computer 322 via lead 370. Computer 322 with this information plus the information provided by encoder 316 along with the units of power measured by Hall effect sensors can vary feeds and index rates can utilize this information to provide for hob cutter shift when the rates of feed and index are reduced to a predetermined level due to the condition of the cutter. Once the cutter has a uniform predetermined condition of wear the computer can issue instructions to sharpen the hob cutter.

Hob cutting machine 400 utilize a rapid travel motor 374 which also may be advantageously employed in accordance with the invention to reduce the amount of time necessary to set up hob cutting machine 400. Rapid travel motor 374 is attached to rapid feed drive 372 to more quickly set table 402 in a predetermined cutting position depending upon the thickness of the workpiece on table 402. A motor and brake control 378 is provided along with a shaft encoder 416 or a tachometer or sensing device to provide information to computer 322 via lead 384.

Center distance may be controlled in hobbing machine 400 to provide further advantages of the invention when combined with the advantages of computer control in accordance with the invention. Center distance control allows cutter 304 to be advanced toward the workpiece on table 402 in the direction of arrow 406. This adjustment of the hob head 408 has been heretofore provided by a bolt head 418 at the end of bar 420 to move hob head 408. In accordance with a preferred embodiment of the invention bar 420 is extended through the rear of the machine to allow the convenient attachment of a further variable speed electric motor 419 having a similar controller 486 (FIG. 21) and shaft encoder 421 or position sensor 488 for providing information to computer 322 via lead 422. In that manner information as to center distance can be utilized in both setting up the machine and in cutting the gear to produce gears of an optimal configuration. The control electronics for the additional functions of hob shift control, rapid travel, and center distance control will be discussed further hereinafter with reference to FIG. 21.

Referring now to FIGS. 12, 15, 16, 20 and 21 the modification of a further type of hobbing machine will be discussed. Hobbing machine 426 is a type T Barber Coleman hobbing machine having a main cutter motor 302 for turning hob cutter 304. A Hall effect sensor to measure power and an encoder 316 is added to the main motor shaft to provide information to computer 322 through the computer interface (not shown) via lead 320 in a manner that is similar to the modification of the Cleveland Hobbing Machine as has heretofore been discussed.

The mechanical linkages between the main cutter motor 302 and the feed and index drives are also modified so that the change gears are replaced by variable speed electric motors to provide computer controlled variable rate drives in index and feed in response to power readings of the Hall effect sensor and pulses received from encoder 316 on main cutter motor 302 during the cutting of the gear. In hobbing machines 426 the feed of a gear blank supported on table 428 between table 428 and support 430 is provided by the horizontal travel of hobbing machine support table 432. Feed drive 326 includes a gear 328 which is activated by a variable speed electric motor 332 which has been added to replace the traditional change gears. Variable speed electric motor 332 utilizes a controller 334 (FIGS. 12 and 20) and shaft encoder 336 (FIGS. 12, 16 and 21) which provides information to counters in the computer interface via lead 338.

A variable speed electric motor 344 is similarly employed to activate index drive and replace the traditional change gear linkage. It is possible to mount variable speed electric motor 344 like variable speed electric motor 332 in change gear box 434 on a index shaft that drives table 428. In the preferred modification of the invention variable speed electric motor 344 is mounted directly to existing gear 342 for driving shaft 340. Variable speed electric motor 344 is adapted with a worm gear 436 instead of gear 346 which in some applications in modifying existing hobbing machines is preferred. Variable speed electric motor 344 similarly employs a controller 348 (FIGS. 12 and 21) and shaft encoder 350 to provide information to computer 322 through the computer interface by lead 352.

Hobbing machine 426 does not have an existing adjustment for hob shift control. Such prior art machines are modified to cut gears in accordance with the invention by modifying feed and index rates. At such time as these rates drop to a predetermined level the computer can be programmed to provide instructions to resharpen the hob.

Hobbing machine 426 has a center distance control which may be utilized to provide further advantages of the computer controlled machine of the invention. Center distance control allows the table 428 and support arm 437 to be raised and lowered in guide 438 to control the center distance between the hob and the work piece in a manner similar to that described with respect to hobbing machine 400. Hobbing machine 426 was modified in accordance with the invention by adding a gear 440 on existing shaft 442 and adding a variable speed motor 419 and worm gear 444 to turn shaft 442. Variable speed electric motor 418 includes a controller and shaft encoder 421 or position sensor 488 (FIGS. 16 and 21) for providing information to computer 322 through a computer interface counter via lead 422. The computer program for the center distance control will be further discussed hereinafter with respect to FIG. 21.

The modification of a Type D hobbing machine manufactured by Barber Coleman will now be discussed with reference to FIGS. 12, 17, 18, 19 and 20. The modification of the type D Barber Coleman Hobbing machine is in many respects similar to the modification of the Barber Coleman type T hobbing machine as has heretofore been discussed. The major differences between the two machines is the type D includes a hob shift control and is a hydraulic machine that is modified in accordance with the invention.

The modification of such machines includes wherever possible the replacement of hydraulic drives with positive gear drives. The modification of hobbing machine 450 includes the utilization of the main cutter motor 302 by adding encoder 316 to provide information to computer 322 through the computer interface 318 via lead 320. In hobbing machine 450 feed drive for a gear blank supported on table 452 between table 452 and support 454 is provided by the horizontal travel of hobbing machine support table 456. A variable speed electric motor is attached to feed drive 326 by a gear 328 that is activated by variable speed electric motor 332. Variable, speed electric motor 332 utilizes a controller 334 (FIG. 21) and shaft encoder 336 (FIGS. 17 and 21) to provide information to counters in the computer interface via lead 338.

A second variable speed electric motor 344 is similarly utilized to activate index drive. Variable speed electric motor 344 is mounted directly to an existing gear 342 for driving shaft 340. Variable speed electric motor 344 preferably employs a worm gear 436 to turn gear 342. Variable speed electric motor 344 similarly employs a controller 348 (FIG. 21) and shaft encoder 350 (FIGS. 18 and 21) to provide information to the computer 322 though the computer interface 318 by lead 352.

Hobbing machine 450 unlike hobbing machine 426 employs hob shift which may be advantageously utilized in accordance with a preferred embodiment of the invention. The modification of the hob shift of hob cutter 304 of head 456 includes the addition of a variable speed electric motor 360 having a controller 362 (FIG. 21) and shaft encoder or position sensor 368 (FIGS. 19 and 21) to provide information to computer 322 via lead 370. Variable speed motor 360 utilizes a worm gear 458 to activate a hob shift gear 460 to provide axial shift of the hob during gear cutting operation in response to variable information received by the computer as to the actual cutting rates of the variable speed feed and index feed and index drives. At such point in time that feed and index drives reach a predetermined rate the computer can actuate variable speed electric motor 360 to shift the hob to maintain cutting efficiency. When hob shift has completed travel the computer can be programmed to issue instructions for sharpening the hob cutter.

Figure 21:
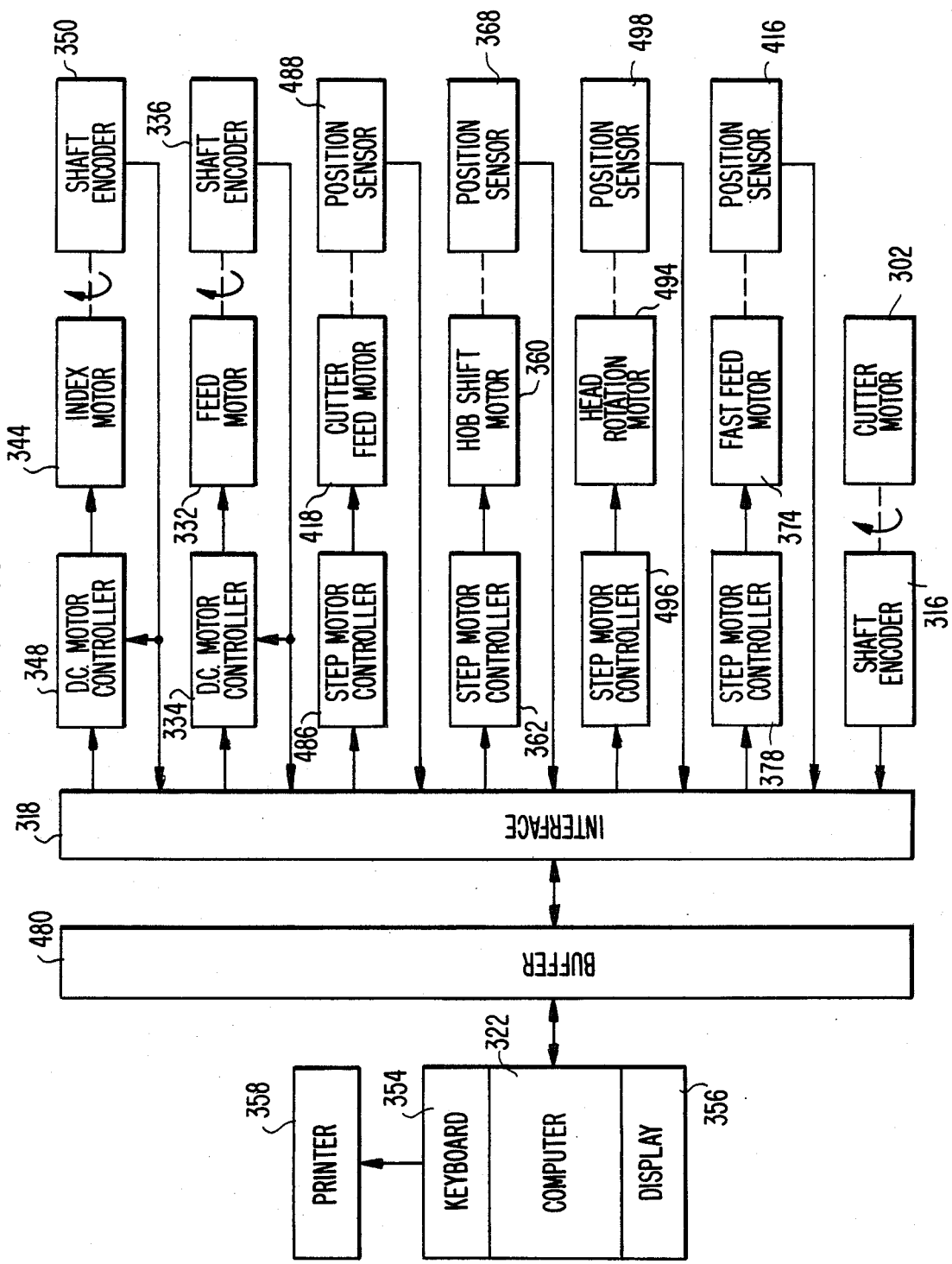
FIG. 21 is a flow chart of the preferred form of providing computerized control for existing hob machines modified in accordance with the invention.

Hobbing machine 450 like hobbing machine 426 has a center distance control feature that may be advantageously employed in accordance with the invention. The center distance control similarly allows arm 462 of machine 450 to be raised and lowered which is activated by the rotation of existing shaft 442. Shaft 442 is turned by gear 440 which is activated by variable speed electric motor 418. Variable speed electric motor 418 includes a controller 486 (FIG. 21) and shaft encoder or position sensor 488 (FIGS. 18 and 21) which provides information to computer 322 through a computer interface 318 counter via lead 433. The computer program for these additional features is illustrated in FIG. 21 and will be discussed hereinafter in greater detail.

Referring now to FIGS. 12, 20, 22, 23 and 24 a simplified computer system will be described wherein pulses measured by encoder 316 and relayed to computer 322 will be discussed. The hob control electronics operate as an electronic gearbox which allows for the selection of unlimited gear ratios between the cutter shaft and index shaft and between the cutter shaft and feed shaft during the cutting of the gear. The desired ratios are calculated before the cutting of the gear based on gear design data provided by the machine operator with the computer thereafter controlling the cutting operation by varying index and feed within parameters to maintain a predetermined cutting program. Machines modified in accordance with the invention can cut high quality spur, helical gears and splined shafts with set up time of less than ten minutes.

Figure 20:
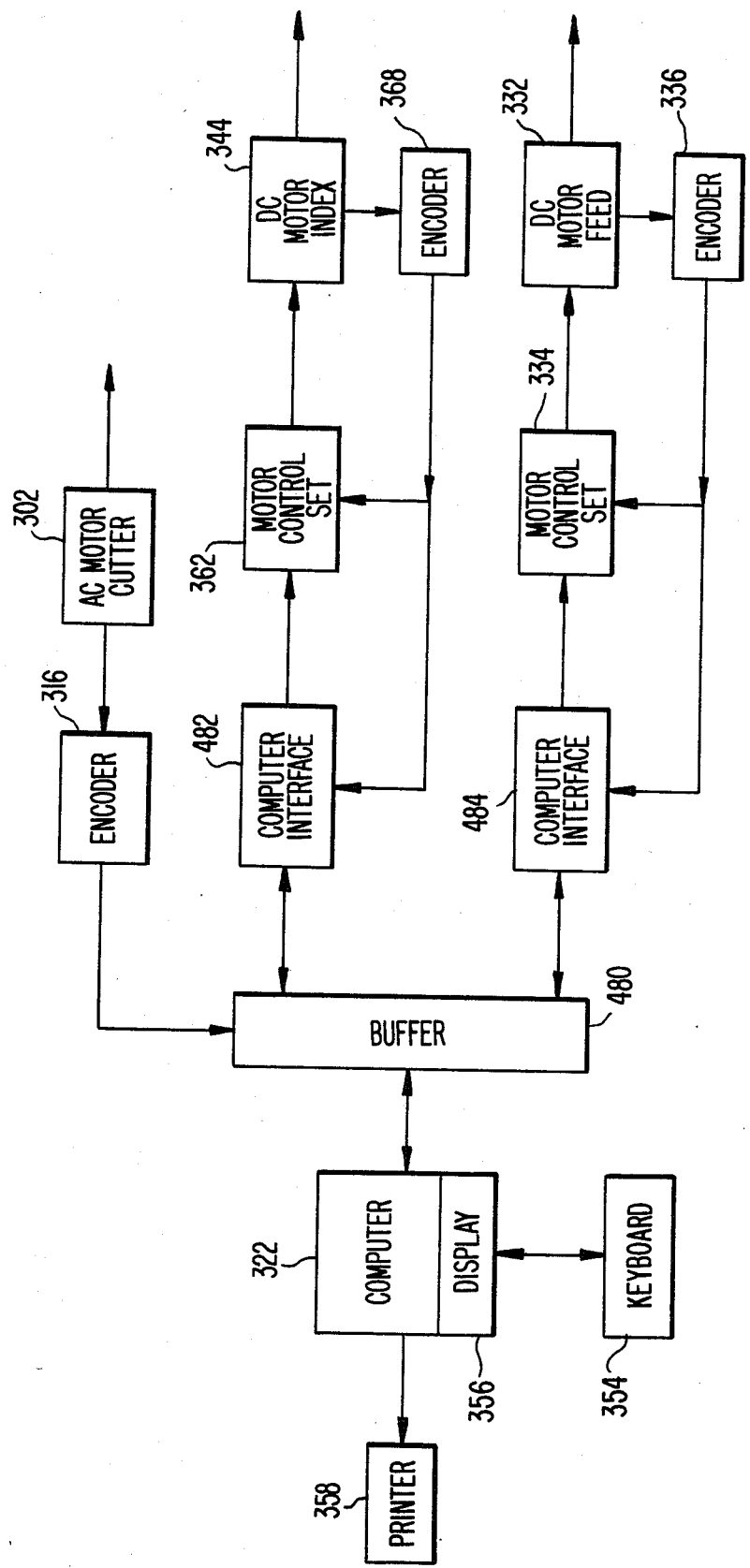
FIG. 20 is a flow chart illustrating one form of control for existing hob machines modified in accordance with the invention.

Referring to FIG. 20 gear design data is entered into the computer 322 through the keyboard 354 in response to prompts appearing on the computer display 356. Input data correctness is verified by the operator by monitoring data on the display 356 and also by requesting a formatted data summary on an optional computer printer 358.

After data entry and verification and upon operator request, the computer calculates the numeric quantities necessary for controlling index and feed motor velocities. In the RUN mode, the computer monitors the velocity of the cutter motor through buffer electronics 480 through computer interface 318 which has been illustrated as computer interface 482 and computer interface 484 in FIG. 20 which provides appropriate "outer loop" controls for the index and feed control loops. Preferably the motor control set 362 and 334 controls, the DC motors 344 and 332 and the encoders 368 and 336 are commercially available DC servo motor systems with self contained inner-loop control functions.

The buffer electronics 480 network (FIG. 22 provides both one way and two way electrical signal buffering between the computer 322 and the computer interface electronics 482 and 484 and one way buffering between the cutter shaft encoder 316 and the computer 322.

Figure 25:
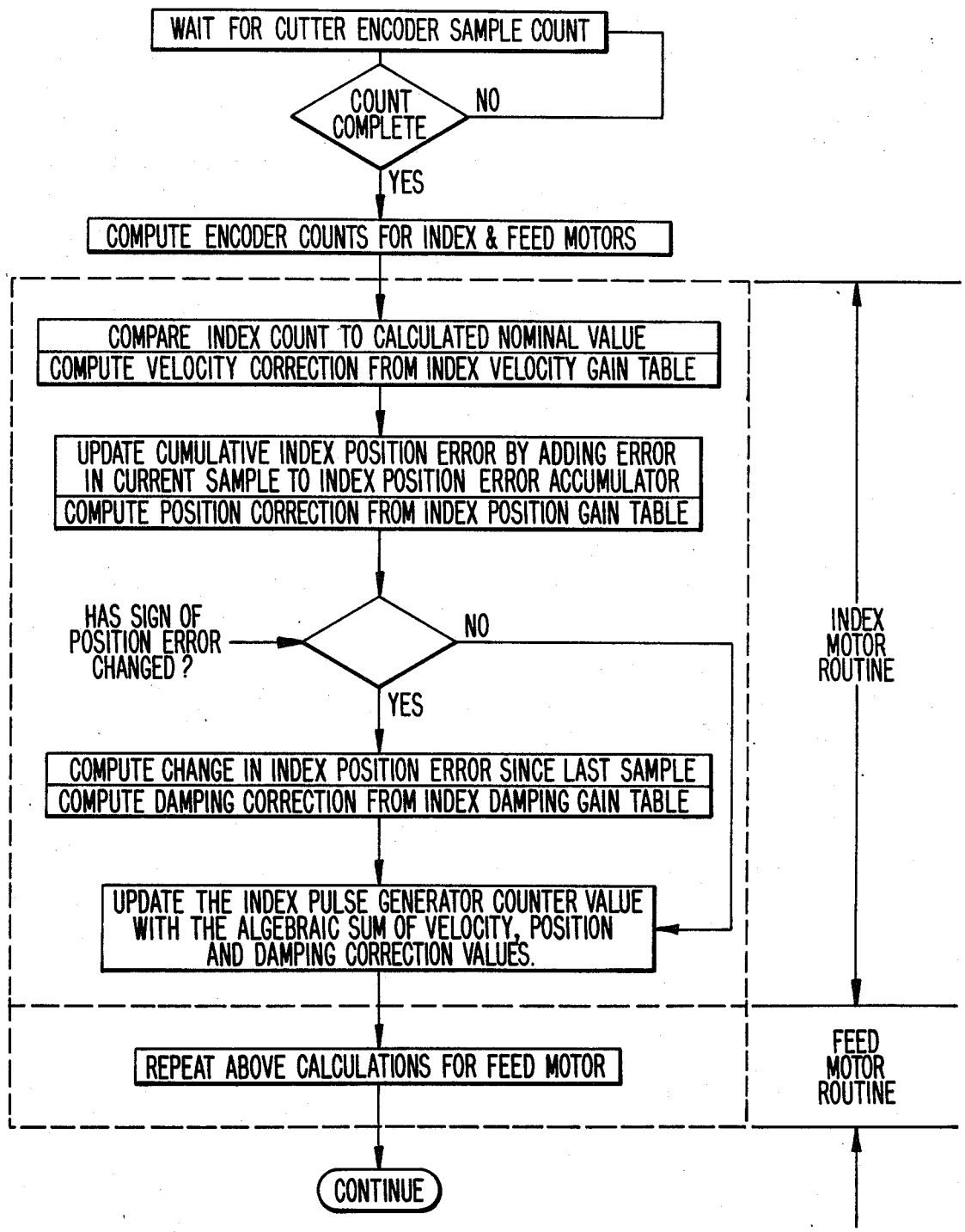
FIG. 25 is a flow chart of a motor control algorithm for gear cutting machines in accordance with one embodiment of the invention.

The computer interface electronics networks 482 and 484 provides pulse trains to the index control set 362 and feed motor control set 334 and also receives and accumulates feed back pulses from the index 334 and feed shaft encoders 368 and 336 respectively. In FIG. 23 the pulse trains are depicted in flow chart form. The pulse trains are preferably formed by employing a high speed frequency divider technique. An output pulse is generated and the counter is automatically reloaded from the register each time the output counter reaches zero. The counter operates at 20 mhz giving a pulse period resolution of 5 nanoseconds. The feedback pulse counter is sampled periodically by the computer at a rate determined by the cutter shaft velocity. A flow chart illustrating the logic and calculations in coordinating cutter shaft encoder impulses with feed and index is illustrated in FIG. 25.

Figure 24:
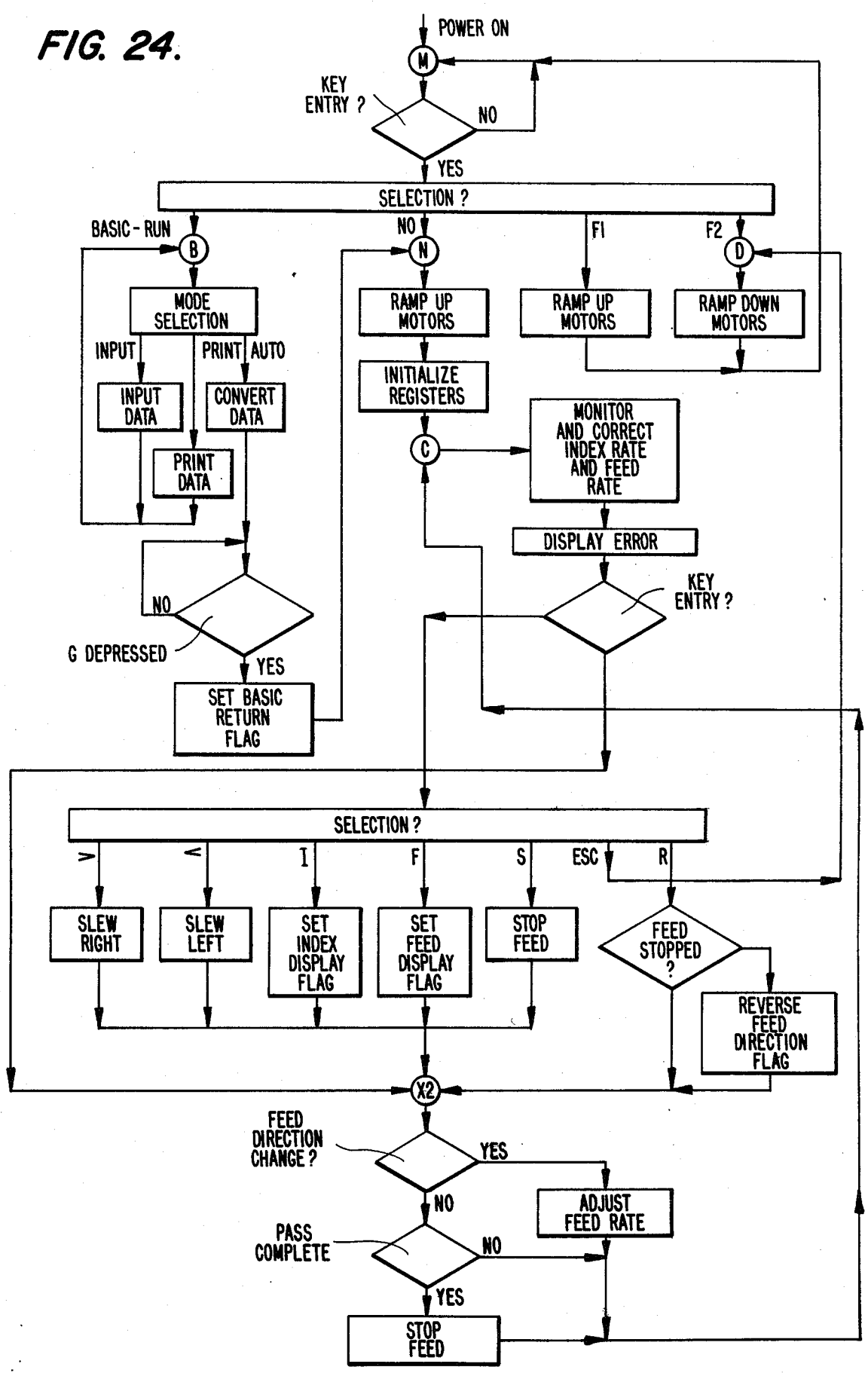
FIG. 24 is a flow chart of one form of logic system of FIG. 20 for modifying cutting machines in accordance with the invention.

The computer software program is illustrated in FIG. 24. Upon initial application of power, the computer 322 enters the "monitor" mode and waits for a key or keys on keyboard 354 to be depressed. The operator normally selects a key sequence which takes the program to node B. A mode selection menu is displayed to the operator, and, on the first pass, the operator chooses the "input" mode. In response to a series of prompts the operator enters gear design data including present date, part number, cutter thread direction, workpiece normal diametral pitch, number of teeth, feed rate, height, helix angle and direction (if applicable). Data appears on the computer display for verification as it is being entered.

When data input is completed, the program returns to the mode selection menu. The operator then chooses the "print" mode. The computer prints a formatted summary of the gear design data for the operator's perusal.

Again the mode selection menu appears. This time the "auto mode" is chosen. The computer processes the input data and solves a series of trignometric equations to establish the constants necessary for the control mode. This processing terminates with an operator display prompt indicating the G key must be depressed to enter the control mode.

After verifying that the workpiece and cutter are positioned correctly and the cutter shaft is rotating, the operator causes the computer to enter the control mode designated by node N in FIG. 24. The computer responds by sending a series of numbers to the pulse output counters, the numbers arranged to gradually increase the index and feed motor velocities to the desired rates. After waiting a few seconds for this to occur, the operator manually advances the cutter an appropriate distance to achieve the desired depth of cut.

In the control mode the computer periodically samples the pulse counter from the cutter, index, and feed motor shaft encoders. As discussed in the equipment section above, the sample rate depends on the cutter shaft velocity. A sample period equal to the time required to accumulate 1000 cutter shaft pulses was selected. This time period varies in length due to variations in the cutter shaft velocity, but is typically about 25 milliseconds. After 1000 cutter pulses are counted, the computer reads the index and feedback counters. The differences between these count values and the value at the end of the previous sample period are the count values for the current period. These values are compared to the calculated desired value and errors are accumulated continuously. Cumulative error values are used to calculate correction factors for the output pulse generator to correct the index and feed motor velocities in the direction of zero cumulative error.

Correction values for the pulse generators are computed using "gain tables". Rounded error values are used as indices to a table of values which are added or subtracted from the measured error values. This method is the basis for the stable and accurate motor control functions necessary to manufacture high quality gears and splines. During the control mode, instantaneous cumulative position errors are displayed to the operator.

Following the error display update, the program checks for a key entry. If no keys are depressed, the program continues at X2 in FIG. 24. If "<" or ">" is depressed, the computer adjusts the error count. This causes the workpiece to process in the desired direction with respect to the cutter during subsequent adjustments of the index rate. This enables the operator to align the workpiece semi-automatically if automatic operation is interrupted for any reason. If "I" or "F" is depressed, the selected error type is displayed on subsequent program cycles. If "S" is depressed, the computer gradually decreases the feed motor velocity bringing the feed to a complete halt. If "ESCAPE" (illustrated as ESC on FIG. 24) is depressed, both motors are halted gradually. If "R" is depressed and the feed was previously halted, the feed direction flag is reversed and the feed rate is gradually increased during subsequent program cycles until the desired rate is achieved. If the feed is not at rest when "R" is depressed, "R" is ignored.

Feed motor pulse counts are accumulated and compared to a predetermined value to identify the end of the present pass. When this occurs, the computer gradually decreases the feed motor velocity to zero during subsequent program cycles while maintaining alignment between the workpiece index and the cutter. This eliminates the need for semi-automatic realignment prior to the next pass, which will be in the opposite direction. In addition to the normal control mode, for testing and examination purposes, open loop motor operation can be selected by depressing the F1 and F2 keys.

The advantages of the invention are increased where additional functions such as hob shift, center distance control, hob angle and a rapid feed motor is controlled by computer 322. These additional features reduce set up time and increase the accuracy of gears produced by gear cutting machines modified and constructed in accordance with the invention. The mechanical steps that may be eliminated by incorporating additional drives in the computer program and machine are those steps heretofore required to set up hobbing machines. These set up steps which are performed in accordance with established hobbing practice are as follows:

1. The workpiece must be properly positioned in the chuck and checked for concentricity. This is a manual operation.

2. The cutter head must be rotated to the correct angle. This can be accomplished manually or under computer control. (See FIG. 21)

3. The cutter must be advanced an appropriate distance to achieve the desired depth of cut. This may be accomplished manually or under computer control. (See FIG. 21)

4. The table feed must be advanced an appropriate distance to position the workpiece for the cutting operation. This may be accomplished manually or under computer control. (See FIG. 21)

5. If the machine has the continuous hob-shift feature, the axial position of the cutter must be initialized. This may be accomplished manually or under computer control. (see FIG. 21)

Referring now to FIGS. 12-21 the control of the additional computer drives will be discussed. In FIG. 21 the main cutter motor index and feed motors is illustrated with encoders to provide variable speed drives. Additional variable speed motors and sensors have been added to provide center distance control hob head rotation and fast feed. Hob shift has already been described with respect to hobbing machines 400, and 450. Center distance control or cutter feed has been described in reference to hobbing machines 400, 426 and 450 in which electric motor 419 is controlled with a controller 486 and shaft encoder or position sensor 488. In a similar manner a rapid travel or fast feed motor 374 can be utilized along with a controller 378 and a encoder or position sensor 416. A further drive may also be connected to the computer to provide the advantages of the present invention. The computerized control of the hob angle resulting from the angular rotation of hob assembly 490 (FIG. 13) or the angular rotation of hob platform 492 on hob support table 432 (FIGS. 15 and 17) may be similarly controlled by an additional motor 494 controlled by a controller 496 in which a position sensor 498 provides information to computer 322 which can be used to calculate precise angles to reduce machine set up time and increase the quality of gears cut in accordance with the invention.

Figure 26:
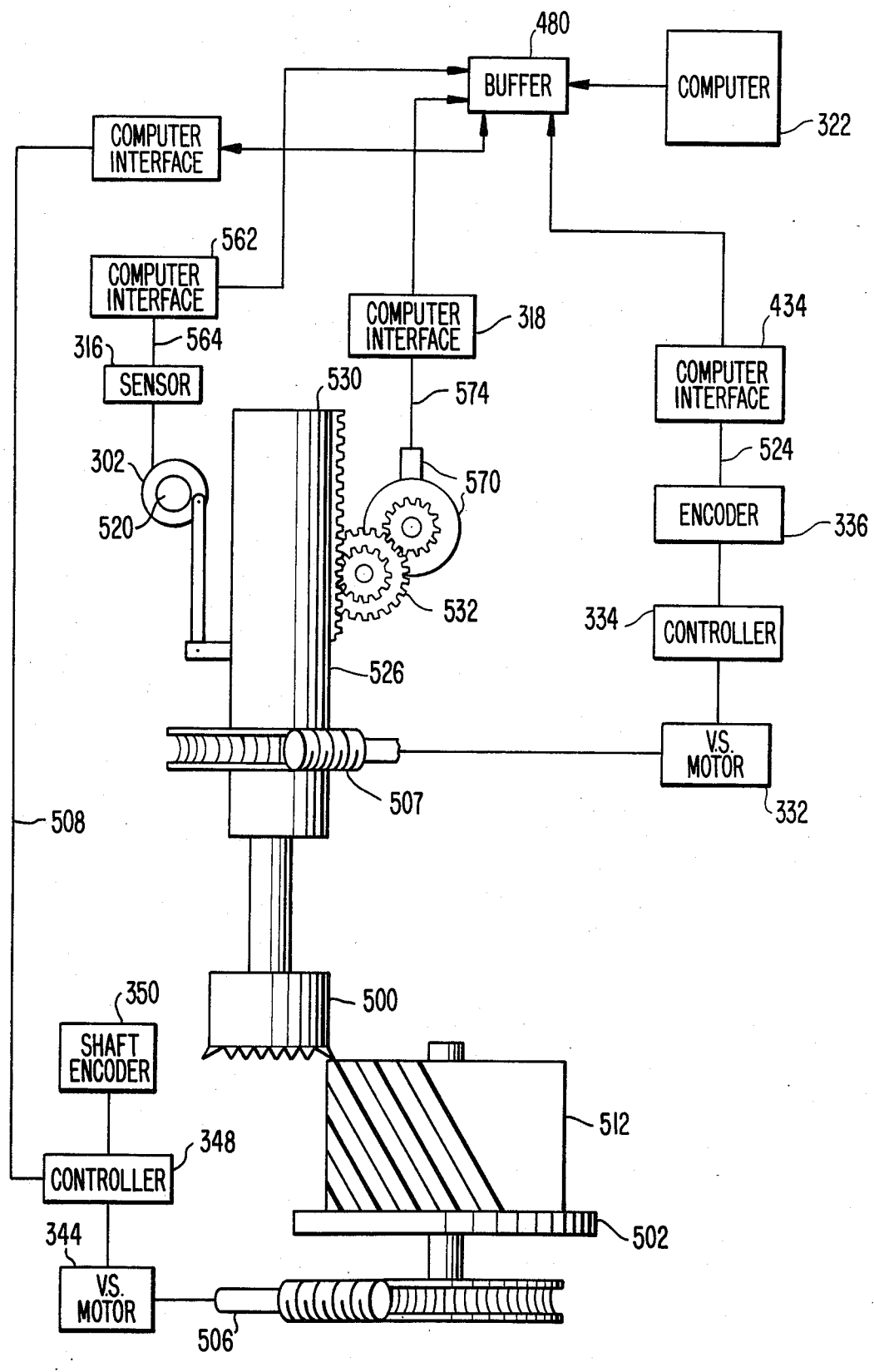
FIG. 26 is a diagrammatic illustration of a shaper cutter depicting the application of a computer and control system to an existing shaper cutter modified in accordance with the invention.

Referring now to FIGS. 20 and 26 the invention will now be further detailed to provide for the construction or modification of existing shaper cutter machines to provide the advantages of the present invention. In shaper cutters modified or constructed in accordance with this embodiment of the invention a main cutting motor 302 provides for the reciprocating action of shaper cutter 500. The shaper cutter motor 302 includes an optical encoder 560 or a Hall effect sensor 316 which provides information to computer interface 562 via lead 564.

In a manner analogous to the hobbing machine the shaper cutter provides feed and index drives that are controlled by variable speed electric motors to achieve the advantages of the invention. More particularly the index drive 506 is controlled by variable speed electric motor 344 which is controlled by motor control set 362 having a controller 348 and a encoder 350 that is connected to computer interface 482 via lead 508.

An analogous feed drive 507 for moving shaper cutter 500 rotationally with respect to gear blanks 512 is provided. The feeding of the cutter 500 in relation to the gear blanks 512 is provided utilizing variable speed electric motor 332 along with a motor set control 334 and an encoder 336 which provides information to computer interface 484 as to the rate of feed via lead 524. The computer 322 from the information provided by sensor 316 and encoders 350 and 336 can vary index and feed rates in response to pulses received from encoder or sensor 316 and the vertical position sensor 570 which is connected to computer interface 572 via lead 574. The logic and flow charts described with reference to the control of the hobbing machine is utilized in the control of the shaper cutter. As a result FIGS. 22, 23, 24 and 25 are fully applicable to the shaper cutter including the coordination of the drives of the shaper cutter.

Figure 27:
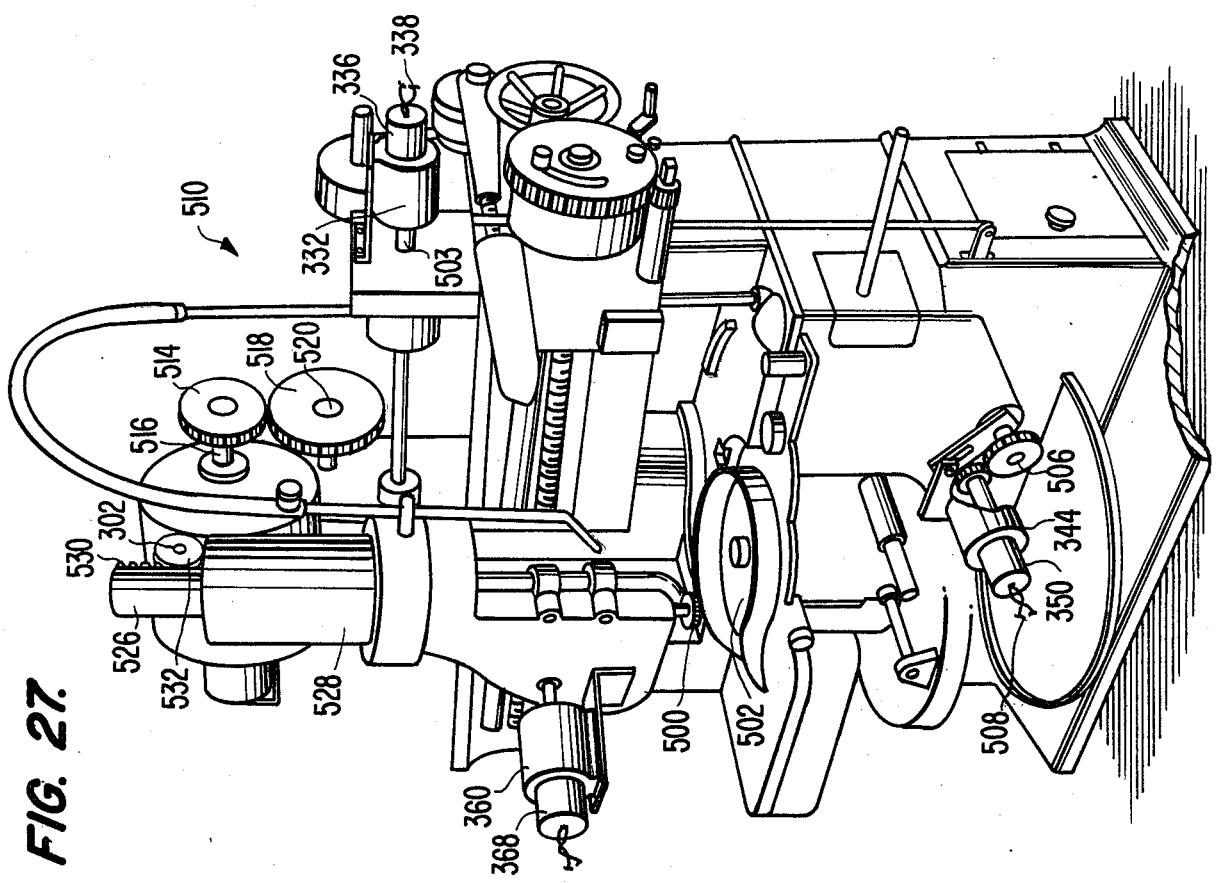
FIG. 27 is a perspective view from the front of an existing shaper cutter illustrating a disposition of variable speed electric motors and encoders in accordance with the invention.
Figure 29:
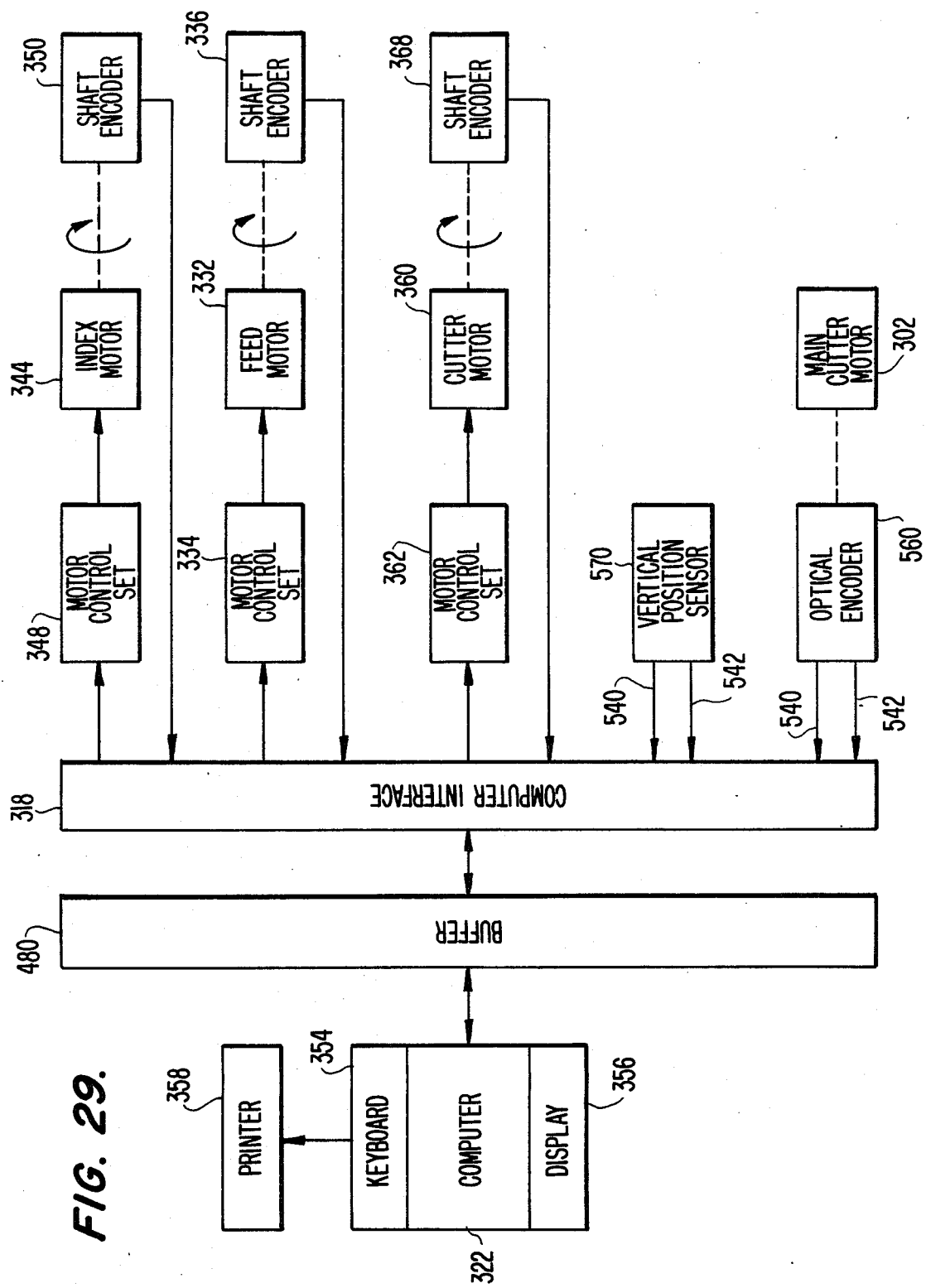
FIG. 29 is a flow chart of the preferred form of providing computerized control for existing shaper cutter machines modified in accordance with the invention.

In existing shaper cutters having center distance control the present invention may be advantageously employed in much the same manner as center distance control in hobbing machines to obtain an improvement in the quality of gears produced. In FIG. 27 and 29 a further variable speed electric motor 360 with a motor control set 362 and an encoder 368 which provides information to the computer interface to monitor and control the center distance between cutter 500 and gear blanks placed upon table 502. The computer program utilized to provide cutter shift will be described hereinafter in greater detail with reference to FIG. 29.

Figure 28:
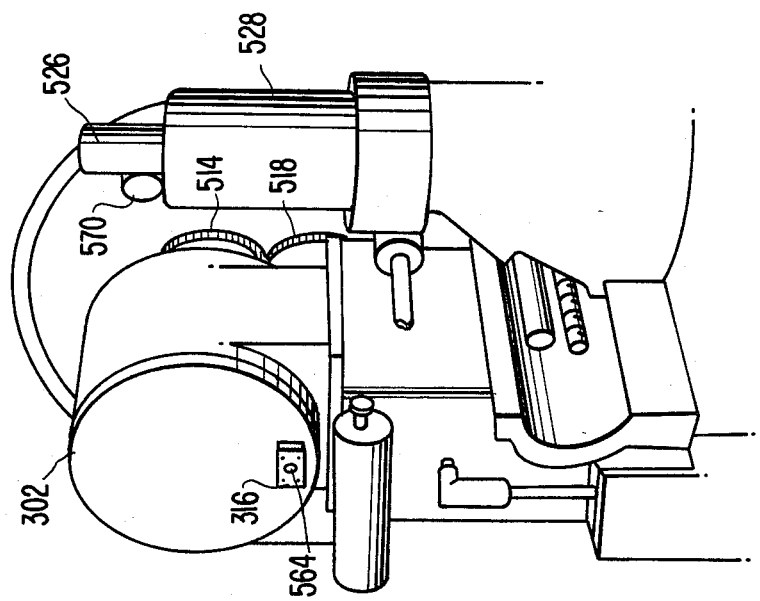
FIG. 28 is a perspective side view of a portion of the shaper cutter of FIG. 27 illustrating a disposition of the variable speed motors and encoders.

The advantages of an embodiment of the invention will be described in the modification of an existing shaper cutter in FIGS. 27-29. In FIGS. 27 and 28 a Barber Coleman type 6A shaper cutter 510 is illustrated in which the drive pulleys and belts between the main cutter motor 302 and the various feed and index drives have been replaced by a gear 514 on the motor shaft 516 and a gear 518 on shaper cutter drive shaft 520. A Hall effect sensor 316 is attached to shaft 516 to provide information to computer 322 as to the cutting power required to drive cutter 500 so that variable speed electric motors attached to index and feed drives may be varied to maintain a predetermined cutting program.

In the modification of existing shaper cutter machine 510, existing index drive 506 is attached to variable speed electric motor 344 having a shaft endoder 350 and controller 348 in which lead 508 is connected to computer 322 to control index drive as has heretofore been described. Feed drive 503 is similarly attached to variable speed electric motor 332 having a controller 336 and shaft encoder 334 which is connected to computer 322 through counters in the computer interface 318 via lead 524. The computer 322 from the information provided by sensor 316 and encoders 350 and 334 and vertical position sensor 570 can compute and vary feed or index within millionth's of a second to provide the advantages of the present invention.

Vertical position sensor 570 can be either an optical encoder or a shaft encoder which can be mounted on a reciprocating portion 526 of shaper cutter assembly 528. In FIG. 26 sensor 570 is illustrated diagramatically as being associated with reciprocating portion 526 by the attachment of a rack 530 having a pinion 532 and an a relay 574 for providing information to computer interface 318 on the position of the shaper cutter with respect to its highest and lowest points in its reciprocal travel.

The operation of the logic system and control of the shaper cutter is similar to the control of the hobbing machine. The basic intelligence and control system for the shaper cutter is illustrated in FIGS. 20, 22, 23, 24, 25 and 26. As indicated in FIG. 24, upon initial application of power, the computer enters the "monitor" mode and waits for a key or keys to be depressed. The operator normally selects a key sequence which takes the program to node B. A mode selection menu is displayed to the operator. The operator chooses the "input" mode and, in response to a series of prompts, enters gear design data including present date, part number, number of cutter teeth, workpiece normal diametral pitch, number of teeth, feed rate and final tooth height, plus helix angle and direction (for helical gears only). Data appears on the computer display for verification as it is being entered.

When data input is completed, the program returns to the mode selection menu. If the operator then chooses the "print" mode, a formatted summary of the gear design data is printed. (printer is optional)

After each sequence, the mode selection menu appears. When the "auto" mode is chosen, the computer processes the input data and solves a series of trigonometric equations to establish the constants necessary for the control mode. This processing terminates with an operator display prompt indicating the "G" key must be depressed to begin the gear cutting operation.

In a manner similar to the set up of the hobbing machine certain procedures are generally followed in setting up the shaper cutter machine. These procedures which are now mechanical can be computer controlled in accordance with the invention as will be discussed in greater detail with reference to FIG. 29. These set up operations are as follows:

1. The workpiece must be properly positioned in the chuck and checked for concentricity and the proper cutter must be installed. These are manual operations.

2. The cutter feed must be advanced an appropriate distance into position for the cutting operation. This may be accomplished manually or under computer control. (See FIG. 29)

Following completion of the setup procedures, the operator commands the computer to enter the control mode, designated by node N in FIG. 24. The computer responds by sending a series of numeric values to the pulse output encoders which accelerate the cutter, index and feed motors to the desired rates and the cutting operation begins.

The preferred application of the present invention to shaper cutter machines designed and existing shaper cutter machines modified in accordance with the present invention contemplates the control of feed, index, and center distance drives by computer 322. It will be recognized that computer control of all of the drives and mechanical set up of the machine not only reduces set up time and the possibility of error but also results in the production of stronger and quieter gears that approach the theoretical calculated values for the dimensions of the gear. The various drives and a flow chart for the control of these additional drives is illustrated in FIG. 29 which is similar to the control for the hobbing machines.

Shaper cutters produced or modified in accordance with a preferred embodiment are controlled by modifying feed and index drives in response to a vertical position sensor or encoder 570 along with Hall effect sensor readings that provides information as to the position of shaper cutter 500 and the power required to drive cutter motor 302. Encoder 570 preferably is an encoder providing information as to the upper-most and lower-most position of the cutter with respect to the gear blank as represented by lines 540 and 542 in FIG. 29. This information is provided to computer interface 318 and to buffer electronics in buffer 480 similar to the buffer electronics illustrated in FIG. 22. The information from buffer 480 is provided to computer 322 which also contains a keyboard 354, a display 356 and an optional printer 358.

Shaper cutter computer 322 is basically the same computer as the computer for the hobbing machine and provides two way communication with index motor 344 through shaft encoder 350 and motor control set 348 to vary index during the cutting of the gear. In a similar manner feed motor 332 includes a motor control set 336 and a shaft encoder 334 to provide a two way communication with computer 322 to allow feed and index drives to be controlled during the cutting of the gear as heretofore described.

The present invention may be implemented in a variety of ways to achieve the benefits of the present invention. It will further be recognized by those skilled in the art that the present invention may be adapted to provide a wide variety of gears by utilizing traditional gear cutting machines and may be utilized in bevel gear cutting machinery and shaper cutters. The present invention, it will be recognized, may be designed to provide for the production of helical gears in shaper cutters without the use of cams. The present method of gear cutting eliminates the change gears in hobbing machines, shaper cutters and the like and eliminates cams in shaper cutters while allowing gears of increased precision to be manufactured by utilizing variable speed electric motors to correlate and control the proper indexing operation of gear cutting machines within millionths of a second. Gear cutting machines constructed in accordance with the invention furthermore provide for increased production of optimally designed gears while reducing the time and error inherent in prior art techniques. The present invention for example, in application to operations involving the mass production of gears significantly contributes to the accuracy and speed of production of improved gears. In small operations involving the production of specialty gears the invention significantly reduces set up time and the calculations necessary to cut desired gear so that typically 4 hours work can be done in one hour and work that heretofore required one day can be accomplished in about two hours.

These and other advantages of the invention and the implementation of the invention in a variety of modes will occur to those of ordinary skill in the art in applying the advantages provided by the invention to hobbing machines, shaper cutters and bevel cutting equipment. The present invention may furthermore be modified by utilizing a plurality of shaper cutters or shavers while achieving the benefits provided by the present invention. These and other modifications and applications of the present invention may be made within the spirit and scope of the invention as defined in the appended claims.

What is claimed is:

1. An apparatus for cutting gears of increased accuracy comprising:
    (a) an electrically activated cutter including encoding means to provide pulses corresponding to information on cutter speed;
    (b) a first electrically activated variable speed motor to provide feed and means for measuring units of power expended to provide feed drive for said gear;
    (c) a second electrically activated variable speed motor to provide index drive and means for measuring units of power expended to provide index drive for said gear;
    (d) means for electronically comparing and correlating said units of power actually expended for feed drive and index drive with said pulses corresponding to said information on cutter speed wherein said means for comparing and correlating includes predetermined units of power ideally or previously expended in cutting a gear of a predetermined design; and
    (e) means for electronically increasing or decreasing said units of power actually expended for said feed drive and index drive in response to said information of cutter speed obtained from said encoding means to operate said cutter during the cutting of said gear and in response to electrically compared predetermined values of units of power required to duplicate said gear of a predetermined design.

2. The apparatus for cutting gears of increased accuracy of claim 1 further comprising a third electrically activated motor on a center distance drive and wherein said means for electronically comparing and correlating includes information of center distance between the cutter and gear in conjunction with the units of power ideally or previously expended in the operation of said feed and index drives required to duplicate said gear of a predetermined design.

3. The apparatus for cutting gears of increased accuracy of claim 2 further comprising a fourth electrically activated motor on a cutter shift drive to provide cutter shift and wherein said means for electronically comparing and correlating includes information on the amount of cutter shift in conjunction with the units of power ideally or previously expended in the operation of said feed, index and center distance drives required to duplicate said gear of a predetermined design.

4. The apparatus for cutting gears of increased accuracy of claim 3 further comprising a fifth electrically activated motor on a drive for angularly adjusting the angle of the cutter with respect to the workpiece and an encoder to provide cutter angular position and wherein said means for electronically comparing and correlating includes information on angular position in conjunction with the units of power ideally or previously expended in the operation of said feed and index drives required to duplicate said gear of a predetermined design.

5. The apparatus for cutting gears of increased accuracy of claim 4 further comprising means for measuring the number of cutter starts on said gear.

6. A method of cutting gears to provide a gear tooth profile approaching the calculated profile comprising:
    (a) cutting a gear with an electrically activated cutter drive having sensor means for providing information on cutter power, angular rotation or a combination thereof;
    (b) operating an electrically activated variable speed motor to provide feed drive and measuring units of angular rotation or power expended or a combination thereof required to provide feed drive for said gear;

(c) operating an electrically activated variable speed motor to provide index drive and measuring units of angular rotation or power expended or a combination thereof required to provide index drive for said gear;

(d) electronically comparing and correlating said units of angular rotation or power or a combination thereof actually expended for cutter drive, feed drive and index drive with predetermined values of angular rotation or units of power or combination thereof ideally or previously required to cut a gear of a predetermined design; and (e) electronically increasing or decreasing said units of angular rotation or power or a combination thereof actually expended for said feed drive and index drive or a combination thereof in response to information on cutter power, angular rotation or a combination thereof obtained during the cutting of the gear and in comparison to predetermined values for units of angular rotation or power or a combination thereof required to duplicate said ideal gear.

7. A method of cutting gears to provide a gear tooth profile approaching the calculated profile of claim 6 wherein said step of operating said electrically activated motors includes increasing or decreasing said angular rotation of said electrically activated variable speed motor to provide feed drive for an existing gear cutting machine and increasing or decreasing said angular rotation of said electrically activated variable speed motor to provide index drive for said existing gear cutting machine.

8. The method of cutting gears to provide a gear tooth profile approaching the calculated profile of claim 7 further comprising the step of adding and operating a further electrically activated motor to provide a center distance control drive in an existing gear cutting machine and calculating, comparing and recording the center distance between the cutter and gear in conjunction with the angular rotation or units of power or a combination thereof ideally or previously expended in the operation of said feed drive, index drive, and center distance control drive and thereafter varying said feed, index, center distance control drive or a combination thereof to maintain said predetermined units of angular rotation or power or a combination thereof ideally or previously required to duplicate said ideal gear.

9. The method of cutting gears to provide a gear tooth profile approaching the calculated profile of claim 8 further comprising the step of adding and operating a further electrically activated motor on an existing gear cutting machine to provide cutter shift and calculating, comparing and recording the amount of cutter shift in conjunction with the angular rotation or units of power or a combination thereof ideally or previously expended in the operation of said feed, index, center distance control and cutter shift drives and thereafter varying said feed, index, center distance control drive and cutter shift or a combination thereof to maintain said predetermined units of angular rotation or power or combination thereof required to duplicate said ideal gear.

10. The method of cutting gears to provide a gear tooth profile approaching the calculated profile of claim 9 further comprising the step of adding and operating a further electrically activated motor on an existing gear cutting machine to provide angular cutter drive for angularly adjusting the cutter with respect to the workpiece and calculating, comparing and recording angular position in conjunction with the angular rotation or units of power or a combination thereof ideally or previously expended in the operation of said feed, index, center distance control, cutter shift and angular cutter drives and thereafter varying said feed, index, center distance control, cutter shift and angular cutter drives or a combination thereof to maintain said predetermined units of angular rotation or power or combination thereof required to duplicate said ideal gear.

11. A shaper cutter machine comprising:
(a) a main motor for driving the shaper cutter;
(b) a speed sensing means for determining the amount of cutter angular displacement and providing information on the shaper cutter speed resulting from driving said shaper cutter by said main motor;
(c) a first variable speed electric motor for providing index drive to a workpiece and means for measuring units of angular rotation or power expended or a combination thereof to provide index drive;
(d) a second variable speed electric motor for providing feed drive for said shaper cutter and means for measuring units of angular rotation or power expended or a combination thereof to provide feed drive;
(e) means for electronically comparing and correlating said units of power actually expended by said first variable speed electric motor and said second variable speed electric motor with said information on said shaper cutter speed wherein said means for electronically comparing and correlating includes predetermined units of power ideally or previously expended in cutting a gear of a predetermined design; and
(f) control means for electronically increasing or decreasing the speed of said first variable speed electric motor or said second variable speed electric motor or a combination thereof in response to said speed sensing means to operate said main cutter motor for driving said shaper cutter during the cutting of said gear and in response to electrically compared predetermined values of units of power required to duplicate said gear of a predetermined design.

12. The shaper cutter machine of claim 11 further comprising a computer having a memory unit having predetermined values for cutter angular displacement or power or a combination thereof required to drive said cutter.

13. The shaper cutter machine of claim 12 further comprising a third electrically activated variable speed motor for activating center distance drive in response to said computer.

14. A gear cutting machine for cutting gears of increased accuracy comprising:
(a) a main electric motor for driving the gear cutter and means for providing pulses corresponding to the speed of said main electric motor;
(b) a variable speed electric motor to provide index drive and means for measuring units of angular rotation or power expended or a combination thereof to provide index drive;
(c) a variable speed electric motor to provide feed drive and means for measuring units of angular rotation or power expended or a combination thereof to provide feed drive;

(d) means for electronically comparing and correlating said units of power actually expended by said variable speed electric motor to provide index drive and said variable speed electric motor to provide feed drive with said pulses from said main electric motor wherein said means for electronically comparing and correlating includes predetermined units of power ideally or previously expended in cutting a gear of a predetermined design; and (e) control means for electronically increasing or decreasing said units of power actually expended by said variable speed electric motor to provide index drive and said variable speed electric motor to provide feed drive in response to the pulses corresponding to the speed of said main electric motor during the cutting of said gear and in response to electrically predetermined values of units of power required to duplicate a gear of a predetermined design.

15. The gear cutting machine for cutting gears of increased accuracy of claim 14 further comprising a variable speed cutter shift.

16. The gear cutting machine for cutting gears of increased accuracy of claim 15 wherein said cutter shift is increased or decreased alone or in combination with increases and decreases of said index drive and feed drive.

17. The gear cutting machine for cutting gears of increased accuracy of claim 15 further comprising an electrically activated motor for adjusting center distance.

18. The gear cutting machine for cutting gears of increased accuracy of claim 17 further comprising an electrically activated motor for providing rapid travel of the workpiece.

19. The gear cutting machine for cutting gears of increased accuracy of claim 14 further comprising an electrically activated motor for adjusting the angle of the cutter relative to the workpiece.

20. The gear cutting machine for cutting gears of increased accuracy of claim 14 further comprising means for receiving and correlating gear cutter power pulse values utilized in the operation of said cutter in conjunction with the material of the gear blank and the size and number of teeth cut on the workpiece.

21. The gear cutting machine for cutting gears of increased accuracy of claim 14 further comprising means for obtaining and monitoring measurements for the axial position of the side of the workpiece, the thickness of the said workpiece and center distance of said workpiece.

* * * * *